(12) United States Patent
Kagei

(10) Patent No.: US 9,024,567 B2
(45) Date of Patent: May 5, 2015

(54) DRIVING APPARATUS, CAMERA PLATFORM APPARATUS AND LENS APPARATUS INCLUDING THE DRIVING APPARATUS, AND DRIVING METHOD OF CONTROLLING THE DRIVING APPARATUS

(75) Inventor: Kenji Kagei, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 176 days.

(21) Appl. No.: 13/489,494

(22) Filed: Jun. 6, 2012

(65) Prior Publication Data

US 2012/0306427 A1 Dec. 6, 2012

(30) Foreign Application Priority Data

Jun. 6, 2011 (JP) ................................ 2011-126391

(51) Int. Cl.
| | | |
|---|---|---|
| *G05B 1/06* | (2006.01) | |
| *G06K 15/00* | (2006.01) | |
| *G01D 5/34* | (2006.01) | |
| *F16M 11/20* | (2006.01) | |
| *F16M 11/18* | (2006.01) | |
| *F16M 11/10* | (2006.01) | |
| *G01D 5/347* | (2006.01) | |

(52) U.S. Cl.
CPC .......... *F16M 11/2014* (2013.01); *F16M 11/18* (2013.01); *F16M 11/10* (2013.01); *G01D 5/3473* (2013.01)

(58) Field of Classification Search
CPC ............... G05B 1/08; H04N 1/40; G01J 1/08; G06K 15/00; G01D 5/34
USPC ................ 318/638, 560; 358/2.1; 250/231.16
See application file for complete search history.

(56) References Cited

U.S. PATENT DOCUMENTS

| 5,493,357 A * | 2/1996 | Hara et al. ...................... 396/85 |
|---|---|---|
| 2005/0067890 A1 * | 3/2005 | Tagome et al. ............... 303/112 |
| 2007/0076259 A1 * | 4/2007 | Nakata et al. .................. 358/2.1 |
| 2007/0108354 A1 * | 5/2007 | Okamoto et al. .......... 248/183.1 |
| 2009/0059060 A1 | 3/2009 | Mukai et al. |
| 2011/0210238 A1 * | 9/2011 | An et al. .................. 250/231.16 |

FOREIGN PATENT DOCUMENTS

| EP | 0699896 A2 | 3/1996 |
|---|---|---|
| JP | 3484289 B2 | 1/2004 |

(Continued)

OTHER PUBLICATIONS

GB Combined Search and Examination Report issued Oct. 31, 2012 for corresponding GB1209555.

*Primary Examiner* — Bentsu Ro
*Assistant Examiner* — Zemenay Truneh
(74) *Attorney, Agent, or Firm* — Rossi, Kimms & McDowell LLP

(57) ABSTRACT

The driving apparatus includes: driving unit driving driven unit; controller controlling the driving unit; portion to be detected in which first areas and second areas are arranged alternately; and detector that detects the first and second areas. The portion includes, on one side of base position in a moving direction, first areas having small width and second areas having different widths larger than the first areas on the one side, and includes, on the other side, second areas having small width and first areas having different widths larger than the second areas on the other side. When moving the driven unit to specific position, the driven unit is driven in direction determined according to an area detected by the detector when starting the operation, and reverses the direction if the driven unit is moved by a predetermined amount or larger in the area after the detection area is changed.

16 Claims, 20 Drawing Sheets

(56) References Cited

FOREIGN PATENT DOCUMENTS

| | | | |
|---|---|---|---|
| JP | 2006078178 A | 3/2006 |
| JP | 2009065298 A | 3/2009 |
| JP | 2010151476 A | 7/2010 |
| WO | 2012114595 A1 | 8/2012 |

* cited by examiner

| AREA Ax | COUNTERCLOCK-WISE-SIDE BOUNDARY [°] | CLOCKWISE-SIDE BOUNDARY [°] | ANGLE WIDTH θx [°] | ROTATION DETECTING SENSOR OUTPUT LEVEL |
|---|---|---|---|---|
| A1 | -179 | -140 | 39 | H |
| A2 | -140 | -135 | 5 | L |
| A3 | -135 | -100 | 35 | H |
| A4 | -100 | -90 | 10 | L |
| A5 | -90 | -60 | 30 | H |
| A6 | -60 | -45 | 15 | L |
| A7 | -45 | -20 | 25 | H |
| A8 | -20 | 0 | 20 | L |
| A9 | 0 | 20 | 20 | H |
| A10 | 20 | 45 | 25 | L |
| A11 | 45 | 60 | 15 | H |
| A12 | 60 | 90 | 30 | L |
| A13 | 90 | 100 | 10 | H |
| A14 | 100 | 135 | 35 | L |
| A15 | 135 | 140 | 5 | H |
| A16 | 140 | 179 | 39 | L |

FIG. 10B

| AREA Ax | COUNTERCLOCK-WISE-SIDE BOUNDARY [°] | CLOCKWISE-SIDE BOUNDARY [°] | ANGLE WIDTH $\theta x$ [°] | ROTATION DETECTING SENSOR OUTPUT LEVEL |
|---|---|---|---|---|
| A1 | -179 | -130 | 49 | H |
| A2 | -130 | -125 | 5 | L |
| A3 | -125 | -95 | 30 | H |
| A4 | -95 | -90 | 5 | L |
| A5 | -90 | -65 | 25 | H |
| A6 | -65 | -60 | 5 | L |
| A7 | -60 | -40 | 20 | H |
| A8 | -40 | -35 | 5 | L |
| A9 | -35 | -20 | 15 | H |
| A10 | -20 | -15 | 5 | L |
| A11 | -15 | -5 | 10 | H |
| A12 | -5 | 0 | 5 | L |
| A13 | 0 | 5 | 5 | H |
| A14 | 5 | 15 | 10 | L |
| A15 | 15 | 20 | 5 | H |
| A16 | 20 | 35 | 15 | L |
| A17 | 35 | 40 | 5 | H |
| A18 | 40 | 60 | 20 | L |
| A19 | 60 | 65 | 5 | H |
| A20 | 65 | 90 | 25 | L |
| A21 | 90 | 95 | 5 | H |
| A22 | 95 | 125 | 30 | L |
| A23 | 125 | 130 | 5 | H |
| A24 | 130 | 179 | 49 | L |

FIG. 14B

| AREA Ax | COUNTERCLOCK-WISE-SIDE BOUNDARY [°] | CLOCKWISE-SIDE BOUNDARY [°] | ANGLE WIDTH θx [°] | ROTATION DETECTING SENSOR OUTPUT LEVEL | EDGE SENSOR OUTPUT LEVEL |
|---|---|---|---|---|---|
| A1 | -190 | -185 | 5 | L | L |
| A2 | -185 | -180 | 5 | L | H |
| A3 | -180 | -130 | 50 | H | H |
| A4 | -130 | -125 | 5 | L | H |
| A5 | -125 | -95 | 30 | H | H |
| A6 | -95 | -90 | 5 | L | H |
| A7 | -90 | -65 | 25 | H | H |
| A8 | -65 | -60 | 5 | L | H |
| A9 | -60 | -45 | 20 | H | H |
| A10 | -40 | -35 | 5 | L | H |
| A11 | -35 | -20 | 15 | H | H |
| A12 | -20 | -15 | 5 | L | H |
| A13 | -15 | -5 | 10 | H | H |
| A14 | -5 | 0 | 5 | L | H |
| A15 | 0 | 5 | 5 | H | H |
| A16 | 5 | 15 | 10 | L | H |
| A17 | 15 | 20 | 5 | H | H |
| A18 | 20 | 35 | 15 | L | H |
| A19 | 35 | 40 | 5 | H | H |
| A20 | 40 | 60 | 20 | L | H |
| A21 | 60 | 65 | 5 | H | H |
| A22 | 65 | 90 | 25 | L | H |
| A23 | 90 | 95 | 5 | H | H |
| A24 | 95 | 125 | 30 | L | H |
| A25 | 125 | 130 | 5 | H | H |
| A26 | 130 | 180 | 50 | L | H |
| A27 | 180 | 185 | 5 | H | H |
| A28 | 185 | 190 | 5 | H | L |

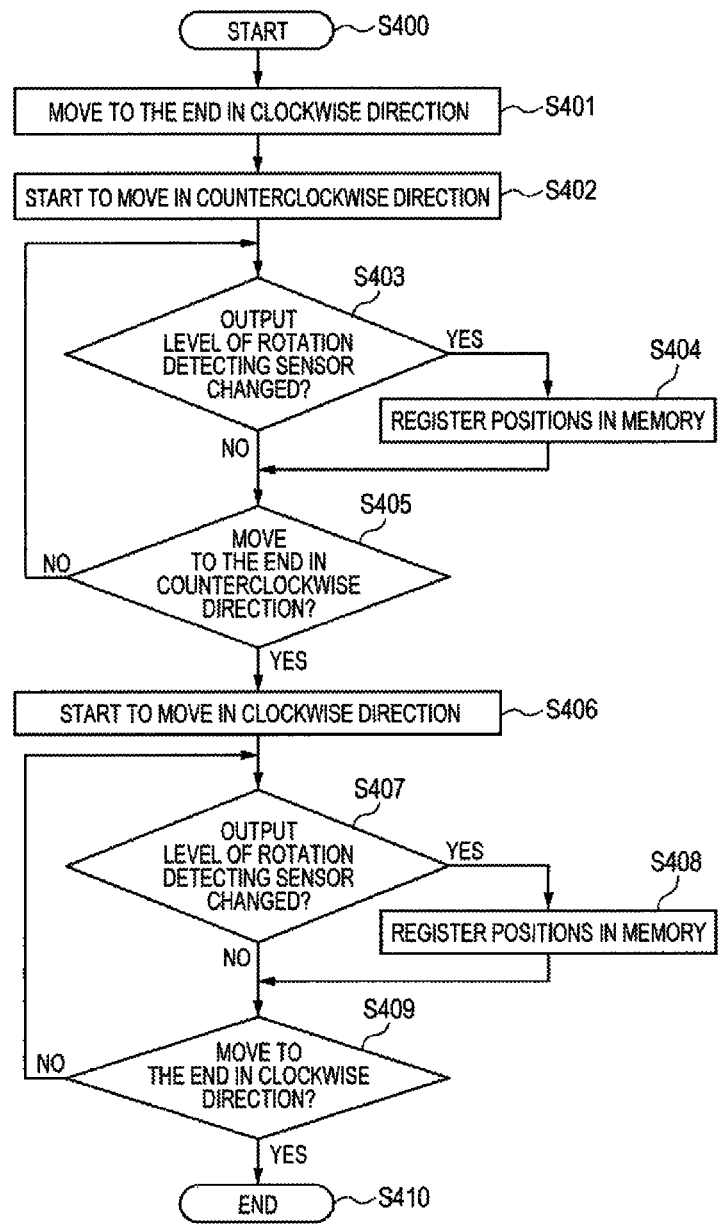

DRIVING APPARATUS, CAMERA PLATFORM APPARATUS AND LENS APPARATUS INCLUDING THE DRIVING APPARATUS, AND DRIVING METHOD OF CONTROLLING THE DRIVING APPARATUS

BACKGROUND OF THE INVENTION

1. Field of the Invention

The present invention relates to a driving apparatus including a driving unit, and more particularly, to a driving apparatus capable of detecting a position, a camera platform and a lens apparatus including the driving apparatus, and a method of controlling the driving apparatus.

2. Description of the Related Art

Conventionally, there is known an apparatus that performs open-loop control without a position detection function, such as an encoder or a potentiometer, to achieve cost reduction. In particular, there is known an apparatus that performs the open-loop control basically but has a simplified position detection mechanism in order to recognize a reference point, as exemplified by a printer and a monitoring camera.

For instance, Japanese Patent No. 3484289 discloses an example of a printer head in which translucent portions and light-blocking portions are alternately arranged with predetermined widths in a center scaling portion and are arranged in an end portion and a reference position portion with widths different from the widths in the scaling portion, so as to detect the end and the reference position. In addition, Japanese Patent Application Laid-Open No. 2009-65298 discloses an example of a lens barrel rotation type image pickup apparatus that detects an end and rotation, in which light-blocking portions and translucent portions are alternately arranged at a constant interval in a rotation detection portion and are formed at an end portion in a different shape from that in the rotation detection portion.

However, in the conventional technology disclosed in Japanese Patent No. 3484289, the scaling portion is formed like a constant fine scale, and hence the current position cannot be grasped by the scaling portion. Therefore, in order to detect the reference position, it is necessary to drive in the entire region at most, and there is a problem that it takes much time to detect the reference position. Further, if the position is lost once, for example, in a case where the printer head is driven by an external force or a case where noise is applied to an optical sensor, a correct position cannot be grasped unless drive to the reference position is performed, and hence there is a problem that it takes much time to reset the position. The conventional technology disclosed in Japanese Patent Application Laid-Open No. 2009-65298 also has the problem that it takes much time to detect the reference position in an initialization process similarly to the case of Japanese Patent No. 3484289.

SUMMARY OF THE INVENTION

It is an object of the present invention to provide a driving apparatus, a camera platform apparatus including the driving apparatus, a lens apparatus including the driving apparatus, and a method of controlling the driving apparatus, in which movement of a driven unit to a specific position can be performed in a short time. According to the present invention there is provided a driving apparatus, including:

a driving unit arranged to drive a driven unit;
a controller arranged to control the driving unit;
a portion to be detected, in which a plurality of first areas and a plurality of second areas, have a different characteristic from the plurality of first areas, are arranged alternately; and
a detector arranged to detect which one of said plurality of first areas or second areas is positioned at a predetermined detection position, wherein:

one of the portion to be detected and the detector is arranged to move in association with the relative movement of the driven unit with respect to the driving unit;

widths of the plurality of first areas disposed on one side of the portion to be detected with respect to a predetermined base position in a movement direction relative to the detector, are different from each other and are larger than a width of any one of the plurality of first areas disposed in the other side of the portion to be detected with respect to the predetermined base position, widths of the plurality of second areas disposed on the other side of the portion to be detected with respect to the predetermined base position in the movement direction relative to the detector, are different from each other and are larger than a width of any one of the plurality of second areas disposed in the one side of the portion to be detected with respect to the predetermined base position, and when the driving apparatus operates in a specific position movement mode in which the driven unit is moved to a specific position, the controller controls the driving unit to drive the driven unit in a drive direction which is determined in accordance with an area detected by the detector when starting the operation in the specific position movement mode, and reverses the drive direction of the driven unit to move the driven unit to the specific position in a case where the driven unit is moved by a predetermined amount or larger in a state in which, after the area detected by the detector is changed, the changed area is being detected.

According to the present invention, the driving apparatus, the camera platform apparatus including the driving apparatus, the lens apparatus including the driving apparatus, and the method of controlling the driving apparatus can be provided, in which the movement of the driven unit to a specific position can be performed in a short time.

Further features of the present invention will become apparent from the following description of exemplary embodiments with reference to the attached drawings.

BRIEF DESCRIPTION OF THE DRAWINGS

FIG. 10B is a table showing end portion angles of individual areas of the sensor slit shape according to the second embodiment.

FIG. 14B is a table showing end portion angles of individual areas of the sensor slit shape according to the third embodiment.

FIG. 19 is a flowchart of the CPU process in an area position registered state according to the fourth embodiment.

DESCRIPTION OF THE EMBODIMENTS

Hereinafter, exemplary embodiments of the present invention are described in detail with reference to the attached drawings. Each of the embodiments of the present invention described below can be implemented solely or as a combination of a plurality of the embodiments or features thereof where necessary or where the combination of elements or features from the individual embodiments in a single embodiment is beneficial.

First Embodiment

Figure 1:
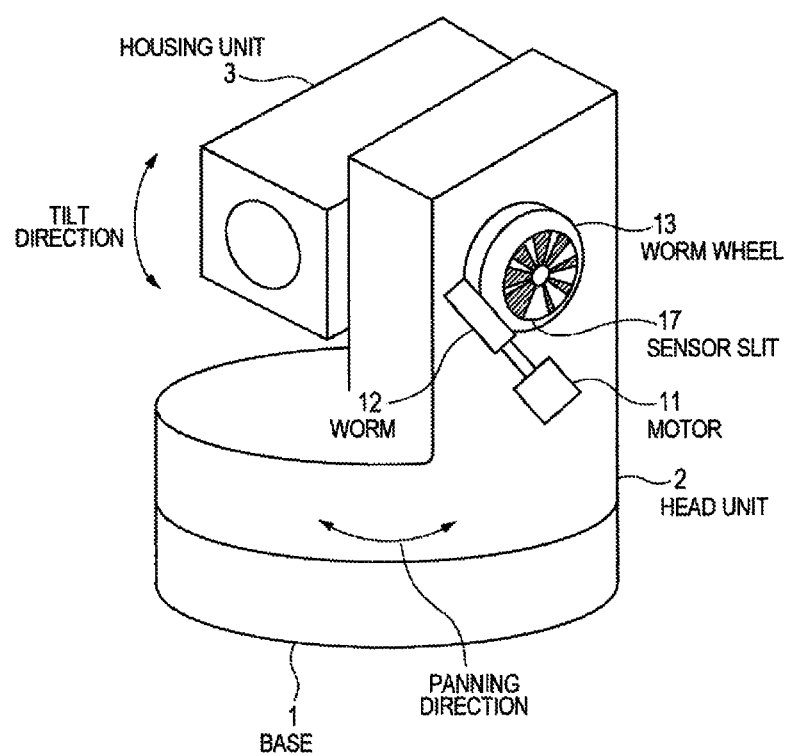
FIG. 1 is a perspective view of a camera mount according to a first embodiment of the present invention.
Figure 2A:
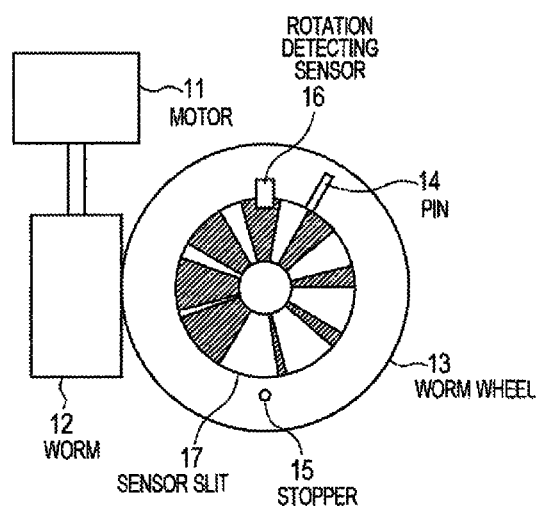
FIG. 2A is a schematic diagram of a driving unit according to the first embodiment.
Figure 2B:
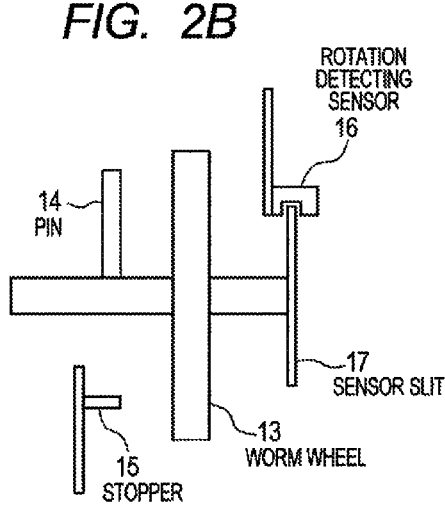
FIG. 2B is a schematic diagram of the driving unit according to the first embodiment.

Hereinafter, a driving apparatus having a position detection function according to a first embodiment of the present invention is described. FIG. 1 is a perspective view of a camera mount according to an embodiment of the present invention. For convenience sake, an internal structure of a tilt driving unit can be seen in the diagram. FIGS. 2A and 2B are schematic diagrams copying the driving unit of the camera mount illustrated in FIG. 1 from two different directions, in which FIG. 2A illustrates a diagram viewed from a direction of a shaft of a worm wheel 13, and FIG. 2B illustrates a diagram viewed from a direction perpendicular to the shaft of the worm wheel 13.

The camera mount includes a base 1, a head unit 2, and a housing unit 3. With respect to the base fixed to an installation place, the head unit rotates in a panning direction, and the housing unit rotates in a tilt direction. Thus, a direction of a camera formed inside the housing changes so that a field angle of an image to be taken can be changed. The driving unit includes a motor 11, a worm 12, the worm wheel 13, and a motor controller 21 for rotating the apparatus as main components, and further includes a pin 14 and a stopper 15 for restricting a rotation angle as components other than the main components. When the motor is rotated, the worm and the worm wheel are rotated so that the apparatus on the same axis as the worm wheel is rotated. The pin rotates together with the apparatus, and the stopper is fixed to the head unit and does not rotate together with the worm wheel. Therefore, when the apparatus rotates by a certain angle, the pin abuts the stopper so that further rotation is inhibited, and hence the rotation angle is restricted. Further, a sensor slit as a rotating member moves (passes) on a detection area of a (fixed) rotation detecting sensor 16 for detecting rotation of the apparatus, and hence the rotation can be detected.

Figure 3:
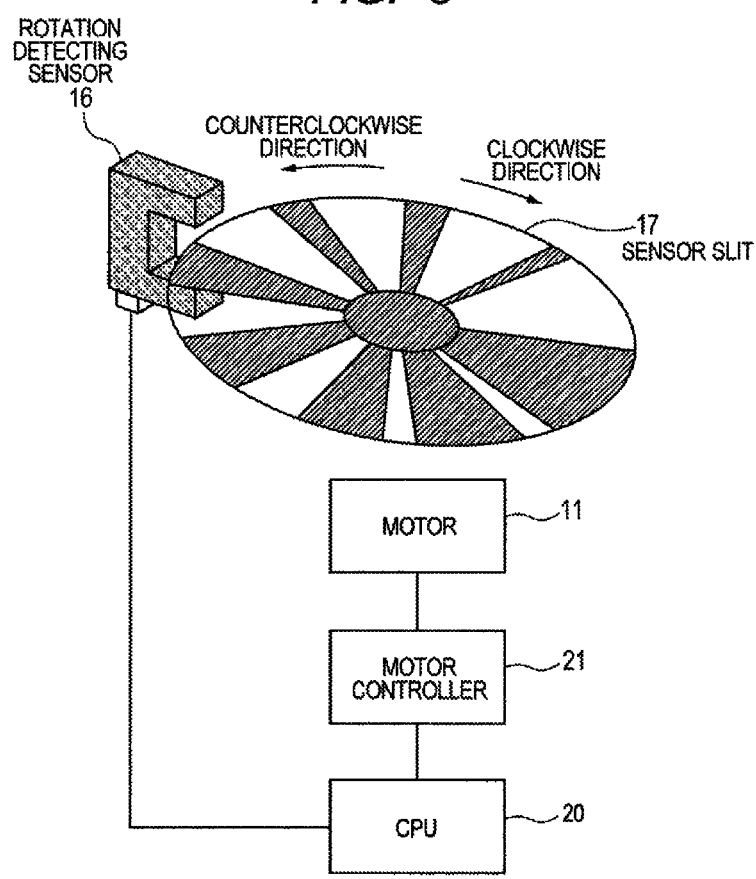
FIG. 3 is a block diagram of the driving unit according to the first embodiment.

Next, with reference to a block diagram illustrated in FIG. 3, in which the structure of the driving unit is simplified, a process of rotating the driving unit is described. Hereinafter, it is supposed that a stepping motor is used as the motor.

A CPU 20 sends to the motor controller 21 a pulse having a frequency corresponding to a rotation speed (drive control signal) so that the motor rotates at a specified speed. The motor controller rotates the stepping motor in accordance with the frequency of the pulse from the CPU. In other words, the CPU 20 has a role as a drive controller that outputs a drive control signal for driving the driving unit. When the stepping motor (driving unit) rotates, the apparatus rotates as a driven unit together with the worm wheel, and the sensor slit also rotates in synchronization with relative movement of the driving unit and the driven unit. The CPU adds the number of output pulses when driving in a clockwise (CW) direction in the diagram, and subtracts the number of output pulses when driving in a counterclockwise (CCW) direction in the diagram, to thereby manage the number of operation pulses $P_{position}$ from a reference position (specific position) as a drive amount. An angle $\Delta\theta_{pulse}$ of rotation of the apparatus and the sensor slit per pulse is determined by parameters unique to the motor and setting in the motor controller. Therefore, the CPU can know an angle from a current reference position (specific position) based on the number of pulses.

Figures 4A, 4B:
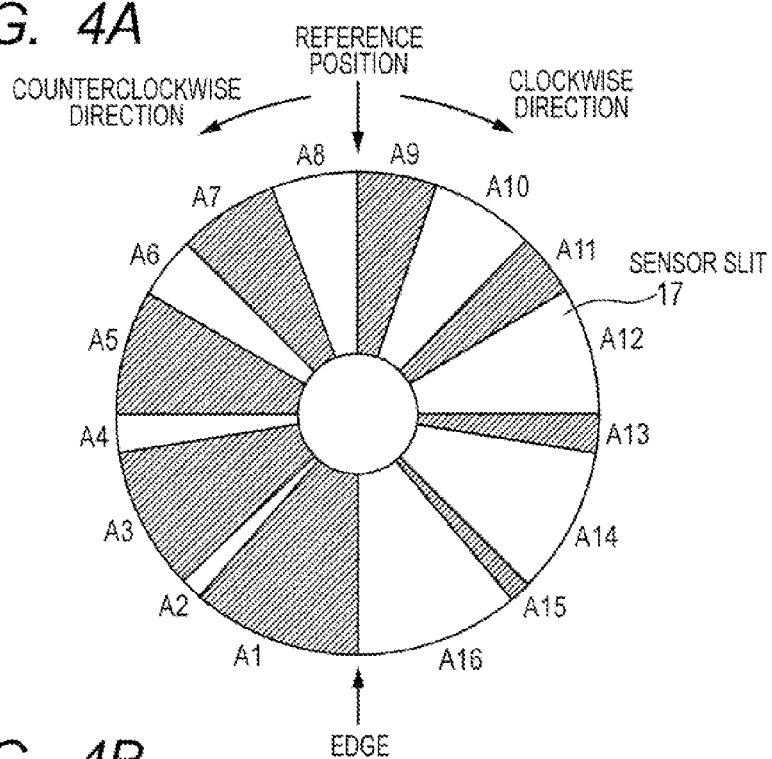
FIG. 4A illustrates an example of a sensor slit shape according to the first embodiment.
FIG. 4B is a table showing end portion angles of individual areas of the sensor slit shape according to the first embodiment.

As an example of the sensor slit as the portion to be detected of the rotation detecting sensor, FIG. 4A illustrates a shape of the sensor slit, and FIG. 4B is a table showing end portion angles (°) on the counterclockwise direction side of individual areas $A_x$ of the shape ("counterclockwise-side boundary"), end portion angles (°) on the clockwise direction side ("clockwise-side boundary"), angle widths $\theta_x$ (°), and output levels of the rotation detecting sensor. The sensor slit has two areas formed by printing with black ink on the translucent member. One is a first area as a light-blocking portion that does not transmit light (blocks light), and the other is a second area as a translucent portion that is transparent (passes light), which are formed alternately in a rotation direction as an operating direction. The light-blocking portions and the translucent portions are not arranged at a uniform interval in the operating direction, but at least one of the plurality of light-blocking portions and the plurality of translucent portions have two or more widths. In this embodiment, areas $A_x$ as the light-blocking portions do not have the same angle width $\theta_x$. In addition, areas $A_x$ as the translucent portions are arranged not to have the same angle width $\theta_x$ (because the light-blocking portions and the translucent portions are formed in the rotation direction in this embodiment, the width as used herein has the same meaning as the angle width).

Figure 5:
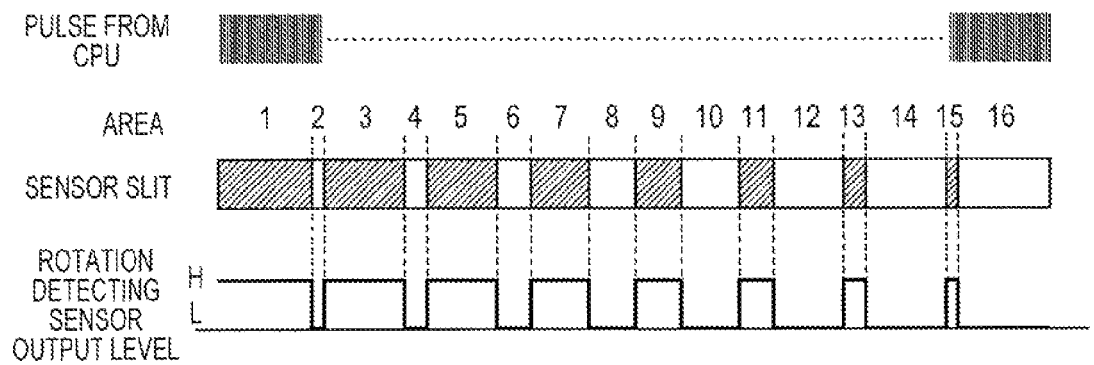
FIG. 5 illustrates an example of an output signal of a rotation detecting sensor according to the first embodiment.

When the sensor slit rotates, the sensor slit on a photointerrupter used in the rotation detecting sensor is switched between the light-blocking portion and the translucent portion, and hence an output level of the sensor changes. FIG. 5 illustrates the output signal of the rotation detecting sensor in a case where the rotation is performed at a constant speed to move from an end in the counterclockwise direction (an end portion when the sensor slit is rotated in the clockwise direction) to an end in the clockwise direction (an end portion when the sensor slit is rotated in the counterclockwise direction). When the sensor slit on the rotation detecting sensor is in the light-blocking portion, H level is output. When the sensor slit is in the translucent portion, L level is output. Thus, the rotation detecting sensor is used as an area detection sensor. The CPU also has a role as a malfunction detector, which compares the output signal from the rotation detecting sensor with an angle calculated from the number of pulses output from the CPU 20, and hence the CPU can detect whether or not the apparatus is rotating as instructed.

In this embodiment, there is exemplified the case where the apparatus rotates together with the worm wheel when the stepping motor rotates, and the sensor slit as the portion to be detected rotates together. However, the present invention is not limited to this embodiment. The same effect can be obtained even when the rotation detecting sensor as the detector is moved in synchronization with the sensor slit as the portion to be detected.

Here, details of the shape of the sensor slit are described. In the design, the number of output pulses $P_x$ of the CPU necessary for rotating from the counterclockwise-side boundary to the clockwise-side boundary in an area $A_x$ can be determined as follows from the angle width $\theta_x$ and the angle $\Delta\theta_{pulse}$ per pulse.

$$P_x = \theta_x / \Delta\theta_{pulse}$$

However, there is a difference $\Delta P$ between $P_x$ and the number of output pulses $P_{count}$ of the CPU when an area $A_x$ is actually moved from the counterclockwise-side boundary to the clockwise-side boundary.

$$\Delta P = P_{count} - P_x$$

A main cause of occurrence of this difference $\Delta P$ is a relative positional shift due to a mounting error between the rotation detecting sensor and the sensor slit, and $\Delta\theta_{position}$ in the angle $\Delta\theta$ corresponding to $\Delta P$ is caused by this relative positional shift. Other than that, there are causes such as detection accuracy $\Delta\theta_{sensor}$ of the photointerrupter and print accuracy $\Delta\theta_{print}$ of the light-blocking portion.

$$\Delta\theta = \Delta\theta_{position} + \Delta\theta_{sensor} + \Delta\theta_{print} + \ldots$$

Therefore, the shape of the sensor slit is set so that a minimum angle width $\theta_{min}$ is larger than twice of $\Delta\theta$ and that a difference between each area and other areas is also larger than twice of $\Delta\theta$.

$$\theta_{min} > 2 \times \Delta\theta$$

$$|\theta_x - \theta_y| > 2 \times \Delta\theta (x \neq y)$$

With this design of the sensor slit, the CPU (position identifying unit) measures $P_{count}$ and finds an area $A_x$ whose difference from a design value $P_x$ is smaller than $\pm\Delta\theta$, so as to identify that the current position is in the area $A_x$. In addition, it is supposed that the light-blocking portions or the translucent portions are not adjacent to each other at the CW end (end portion on the clockwise direction side) and at the CCW end (end portion on the counterclockwise direction side) of the sensor slit. In addition, angle widths $\theta_1$ and $\theta_{16}$ of areas ($A_1$ and $A_{16}$) adjacent to the ends (the CW end and the CCW end) are the largest angles. The angle is set so that each of the light-blocking portion and the translucent portion has a difference with a second largest angle width area ($A_3$ or $A_{14}$) larger than a sum of the error $\Delta\theta$, a mounting error $\Delta\theta_{limit}$ at the end, and an angle $\Delta\theta_{motor}$ from the moving state to the stop of the motor.

$$\theta_1 - \theta_3 > \Delta\theta + \Delta\theta_{limit} + \Delta\theta_{motor}$$

$$\theta_{16} - \theta_{14} > \Delta\theta + \Delta\theta_{limit} + \Delta\theta_{motor}$$

Next, a process flow after electric power-on is described with reference to a state transition diagram of FIG. 6. After electric power-on, the state becomes an area-not-identified state (S1), in which area identifying operation is performed so as to judge which area of FIG. 4 is a current area. By identifying the area, an approximate position can be known, but the position is considered to have an error $\pm\Delta\theta$ from a position on design. Therefore, in order to control the position more accurately, a reference position search process is performed next (S2). When the reference position search process is performed so that the reference position is identified, the state transitions to a normal operation state (S3). In this way, by always searching for the fixed reference position (specific position) at the time of electric power-on, the position can be identified in a range of the error $\Delta\theta_{sensor}$ by the detector that is sufficiently smaller than $\Delta\theta$ in general. In a normal state, when the position cannot be identified due to a motor error, the state transitions to the area-not-identified state again in which the area identifying operation is performed. When the area is identified, the state transitions back to the normal operation state.

Hereinafter, details of the process in each state are described.

First, an area identifying process flow of the CPU in the area-not-identified state is described with reference to a flowchart of FIG. 7. First, the CPU judges whether or not the current position is the light-blocking portion (the light-blocking portion is positioned at the position of the rotation detecting sensor) based on a level of a signal detected by the rotation detecting sensor (S101). When the current position is the light-blocking portion, the sensor slit is rotated in the counterclockwise direction (S102). When the current position is not the light-blocking portion, the sensor slit is rotated in the clockwise direction (S103). After driving the motor, and after the output level of the rotation detecting sensor is changed once (S104), the number of output pulses $P_{current}$ from the CPU is cleared at the current area (S105). After that, the motor is driven continuously, and it is monitored whether or not the motor is driven until the output of the rotation detecting sensor is changed again (S106) or until the number of pulses becomes equal or larger than $P_{max2\_d}$ corresponding to a sum of the second largest angle width area $\theta_{max2}$ and $\Delta\theta$ (S107). When the output level of the rotation detecting sensor is changed again before $P_{current}$ becomes larger than $P_{max2\_d}$, the area $A_x$ having an error between $P_{current}$ and $P_x$ is equal or smaller than $\pm\Delta\theta$ is searched for. In addition, by judging together with information on whether the measured area is the light-blocking portion or the translucent portion, it is possible to identify which area is the current position of the sensor slit (S108).

On the other hand, when $P_{current}$ becomes larger than $P_{max2\_d}$, it can be judged that the measured area is in the largest area adjacent to the edge. Therefore, by judging together with the information on whether the measured area is the light-blocking portion or the translucent portion obtained from the output of the rotation detecting sensor, it is possible to identify the current area. In this way, when the area at the time of electric power-on is $A_2$, for example, the sensor slit is rotated from the clockwise-side boundary to the clockwise direction in $A_1$. Then, it is found that the current position is in $A_1$ after rotation for $P_{max2\_d}$ or more. In addition, there is an angle of $\Delta\theta_{motor}$ or larger between the position and the edge based on the above-mentioned condition of the area adjacent to the edge. Therefore, the motor can be stopped without abutting the edge.

Figure 7:
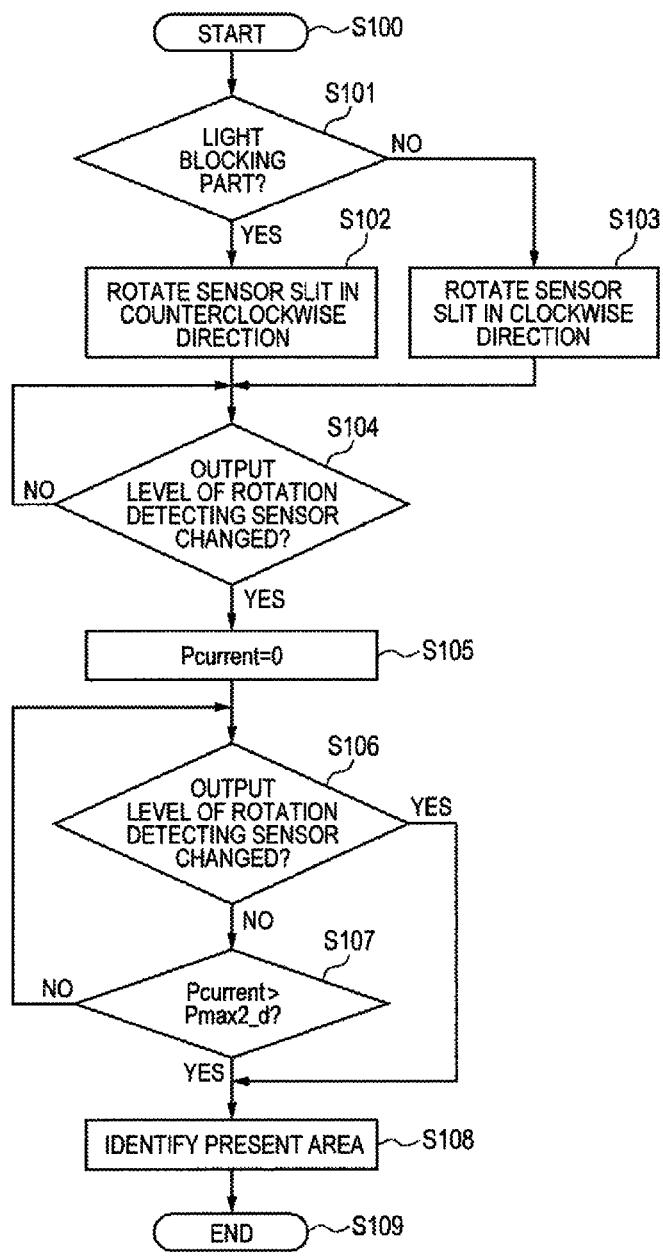
FIG. 7 is a flowchart of a CPU process in an area-not-identified state according to the first embodiment.

In S101 to S103 of FIG. 7, the direction to drive the sensor slit first is determined based on whether the current position is the light-blocking portion or the translucent portion (drive direction determining step). This is performed on a purpose that abutting the edge does not occur when the sensor slit is rotated. In other words, the drive direction is determined in consideration of characteristics of the areas $A_1$ and $A_{16}$ as the end portions (being the light-blocking portion or the translucent portion). When the current position is in the area having characteristics of $A_1$ (light-blocking portion), the sensor slit is rotated in the counterclockwise direction. When the current position is in the area having characteristics of $A_{16}$ (translucent portion), the sensor slit is rotated in the clockwise direction. Thus, even if the slit sensor is rotated from a vicinity of the edge, the drive toward the edge is not performed so that abutting the edge can be prevented. Further, the sensor slit is configured so that a light-blocking portion having relatively large width among the areas of the light-blocking portion and a light-blocking portion having relatively small width among the areas of the light-blocking portion are disposed on the different sides with respect to a base position. Thus, a possibility that a turn-around drive is necessary can be reduced so that more efficient area identifying process can be performed.

Figure 8:
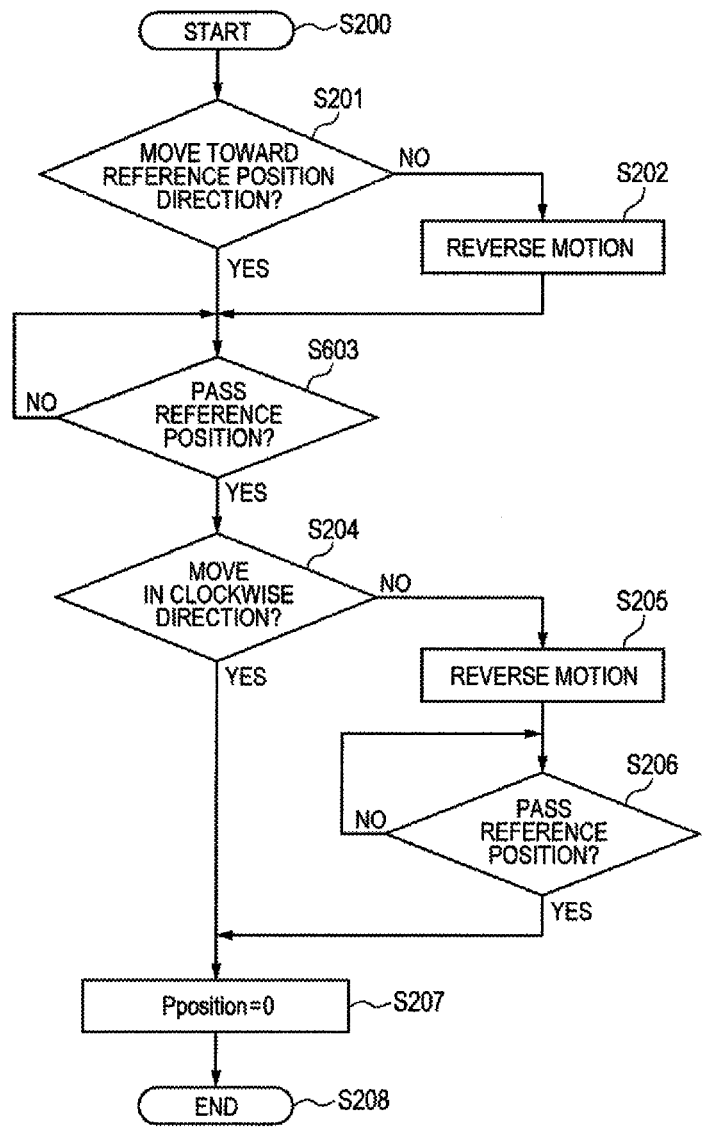
FIG. 8 is a flowchart of the CPU process in a reference position searching state according to the first embodiment.

Next, a reference position detection process flow in the reference position searching state is described with reference to a flowchart of FIG. 8. First, it is judged whether or not the drive is being performed in the direction toward the reference position from the current area identified by the above-mentioned area identifying process (S201). When the drive is being performed in the direction toward the edge, the drive is reversed so that the drive is performed in the direction toward the reference position (S202). When the output level of the rotation detecting sensor is changed, it can be detected that the current area is switched. Therefore, a boundary of a specific area can be detected. In addition, by detecting the boundary and judging the number of output pulses $P_{current}$ from the CPU together with a level of the signal detected by the rotation detecting sensor, it is possible to judge the base position set at a boundary of a specific area (boundary between $A_8$ and $A_9$ in FIG. 4) as a position on the sensor slit located at a position detected by the rotation detecting sensor when moved to the reference position (S203). After passing through the base position, it is judged whether or not the operating direction of the motor is the clockwise direction (S204). When the operating direction is the clockwise direction, the position data $P_{position}$ is cleared (S207), and the reference position detection process is ended. On the other hand, when the operating direction is the counterclockwise direction, the drive is reversed to the clockwise direction (S205), and the drive is performed until passing through the reference position again (S206). When the base position is passed, the position data is cleared, and the reference position detection process is ended. In this way, the base position is passed always from the fixed direction so as to correct the position data. Thus, an error of the position data due to a directional characteristic of the photointerrupter can be avoided, and hence the base position can be detected with higher accuracy.

Figure 9:
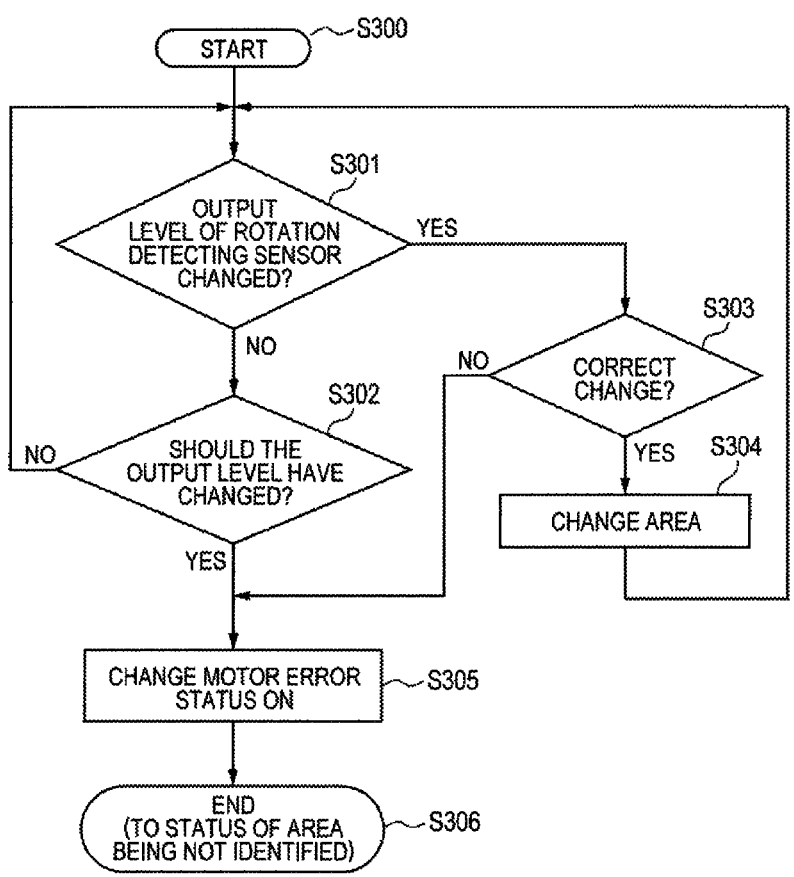
FIG. 9 is a flowchart of the CPU process in a normal operation state according to the first embodiment.

Finally, a process flow of the normal operation state is described with reference to a flowchart of FIG. 9. First, in the normal operation state, the CPU always monitors whether or not the output level of the rotation detecting sensor has changed (S301). When the output level has not changed, the process goes to Step S302, in which it is judged whether or not the output level should be changed based on the number of pulses $P_{position}$ of the current position. When the output level should not be changed, it is judged that there is no problem. Then, the process goes back to Step S301 in which the output level is monitored again, and the process is repeated. On the other hand, when it is judged in Step S302 that the output level of the rotation detecting sensor should be changed based on $P_{position}$, for example, in a case where the motor is being driven but the camera mount does not rotate because of an external force, the process goes to Step S305 in which a motor error state is determined. This state can be judged as a case where the output level does not change even if the drive is performed by the number of pulses larger than a sum of the number of operation pulses $P_x$ of the entire region of the current area $A_x$ and the number of pulses $\Delta P$ corresponding to $\Delta\theta$ when the drive is performed in one direction. In addition, when the drive is reversed between areas $A_x$, the state can be judged as a case where the output level does not change even if the drive is performed reversely by $\Delta P$ or larger than the number of pulses at which the output level has switched last time.

On the other hand, when the output level has switched in Step S301, the process goes to Step S303 in which it is judged whether or not the output level should be switched at the position based on $P_{position}$. When the motor is being driven, and when an error from the number of pulses at which the output level should be switched is smaller than $\Delta P$, it is judged that the operation is properly performed, and the process goes to Step S304 in which the current area is changed. On the other hand, when it is judged in Step S303 that the motor is not being driven, but the output level should not be changed, for example, in the case where an external force is applied so that the camera mount is rotated (the drive is not properly performed), the process goes to Step S305 so as to transition to the motor error status. When the motor error has occurred, the status transitions to the above-mentioned status of area being not identified, in which the above-mentioned area identifying process is performed after a predetermined time. Thus, even if the motor has an operational malfunction temporarily by an external force, the position can be corrected.

In this embodiment, there has been described the rotation operation of the camera mount in which the circular sensor slit is used. However, as a system derived from this embodiment, the present invention can be applied similarly to a linear motion like a motion of a printer head. Specifically, the portion to be detected and the area detection sensor are disposed so that a rotation angle (a displacement in the operating direction) of the portion to be detected with respect to the area detection sensor corresponds to a drive amount of the driven unit. Thus, the present invention can be applied not only to a rotation driving apparatus but also to a linear driving apparatus. Hereinabove, the present invention is applied to the rotation driving apparatus in which the portion to be detected and the area detection sensor are disposed so that the displacement in the operating direction of the portion to be detected, such as the sensor slit, with respect to the area detection sensor for detecting two areas on the sensor slit, such as the rotation detecting sensor corresponds to the drive amount of the driven unit. However, the present invention is not limited to the application to the rotation driving apparatus. For instance, the present invention can be applied also to a linear driving apparatus by disposing the portion to be detected and the area detection sensor so that a displacement distance of the portion to be detected with respect to the area detection sensor (a displacement in the operating direction) corresponds to a drive amount of the driven unit.

In addition, the rotation detecting sensor including a photointerrupter as a photo detection element and the sensor slit constituted of the light-blocking portions and the translucent portions are used. However, it is possible to realize the present invention by a photoreflector and a sensor slit constituted of reflective portions and non-reflective portions. Other than that, an arbitrary member such as a switch may be used as long as the detection signal thereof is switched when the driving unit is rotated.

The shape of the sensor slit is not necessarily a shape having the angle changing gradually from an end to another end as illustrated in FIG. 4, but may be any shape as long as the above-mentioned condition is satisfied. The angle of the light-blocking portion and the translucent portion is also merely an example. It is not necessary to dispose the light-blocking portion and the translucent portion symmetrically as in the embodiment. An arbitrary angle may be adopted as long as the above-mentioned condition is satisfied.

As to the shape of the sensor slit, the light-blocking portion having a largest width among the plurality of light-blocking portions (a largest light-blocking portion or a largest first area) and the translucent portion having a largest width among the plurality of translucent portions (a largest translucent portion or a largest second area) are disposed on the opposite sides with respect to the base position on the sensor slit located at the position detected when the apparatus as the driven unit is moved to the reference position (specific position), and are constituted at positions farthest from the base position.

In addition, when detecting the reference position, the base position is passed always in the clockwise direction finally. However, it is possible to adopt a structure in which the base position is passed in the counterclockwise direction so as to detect the reference position. The place of the base position is set to the position at 180 degrees from the edge, but it is possible to set the base position at an arbitrary position.

Further, the method of returning from a motor error is performed automatically after a predetermined time, but it is possible to judge based on a decision of the area identifying operation when the operation is performed next, and to correct the position when the area is identified.

By the method described above, the operation of detecting the base position without abutting the edge can be performed without operating in the whole circumference. Therefore, the initialization operation can be performed quickly. In addition, the position can be returned by less operation without operating in the whole circumference even if noise enters the detector or if the motor does not properly operate temporarily due to an external force. In addition, these effects can be achieved by a simpler structure.

Second Embodiment

Hereinafter, a second embodiment of the present invention is described.

Figure 10A:
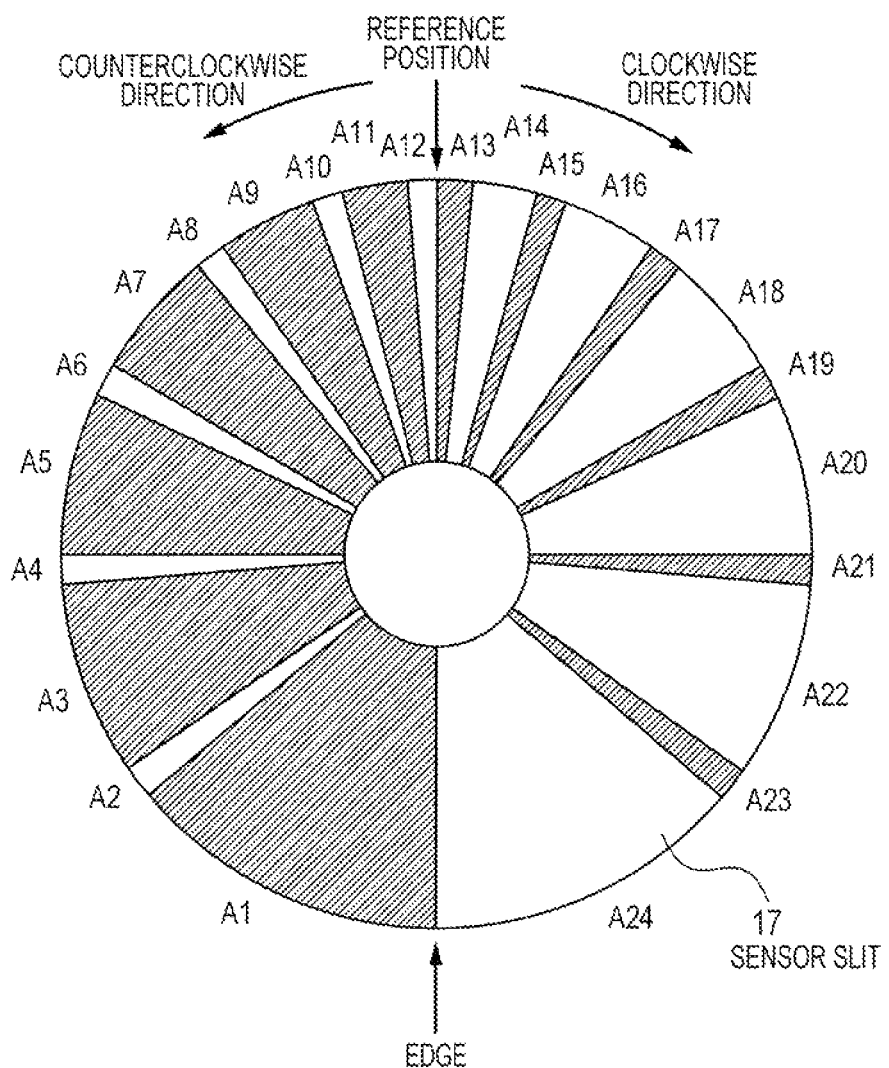
FIG. 10A illustrates an example of a sensor slit shape according to a second embodiment of the present invention.

The structure is the same as the first embodiment illustrated in FIGS. 1 to 3. This embodiment is different from the first embodiment in the shape of the sensor slit, and an example thereof is illustrated in FIGS. 10A and 10B. In this embodiment too, the light-blocking portions that do not transmit light as the first areas and the translucent portions that are transparent (transmits light) as the second areas are formed alternately in the rotation direction as the operating direction. In addition, the light-blocking portion and the translucent portion are not arranged at a uniform interval in the operating direction, but at least one of the plurality of light-blocking portions and the plurality of translucent portions has two or more widths. In the second embodiment, in the clockwise direction side of the base position, the light-blocking portions (A13, A15, A17, A19, A21, and A23) are formed to have a constant angle $\theta_{min}$ larger than twice the error $\Delta\theta$, and the translucent portions (A14, A16, A18, A20, A22, and A24) are formed to have different angles such that a difference angle width between each area and other area is larger than twice A. In the counterclockwise direction side of the base position, the translucent portions (A2, A4, A6, A8, A10, and A12) and the light-blocking portions (A1, A3, A5, A7, A9, and A11) are formed in the opposite conditions. Note that, the base position means a boundary in which the pattern forming the light-blocking portion and the translucent portion is changed on the sensor slit constituted of the light-blocking portion and the translucent portion, and is different from the reference position (specific position) to be a reference when defining the position on the sensor slit (position of the driven unit corresponding to the position on the sensor slit). In this embodiment, the same position is set as the base position and as the reference position. However, the base position and the reference position may be set to different positions.

The angle widths $\theta_1$ and $\theta_{24}$ of the areas $A_1$ and $A_{24}$ adjacent to the edge are set larger than a sum of $\theta_{min}$, the error $\Delta\theta$, the mounting error $\Delta\theta_{limit}$ at the edge, and the angle $\Delta\theta_{motor}$ from moving state to stop of the motor.

$$\theta_1 > \theta_{min} + \Delta\theta + \Delta\theta_{limit} + \Delta\theta_{motor}$$

$$\theta_{24} > \theta_{min} + \Delta\theta + \Delta\theta_{limit} + \Delta\theta_{motor}$$

Figure 6:
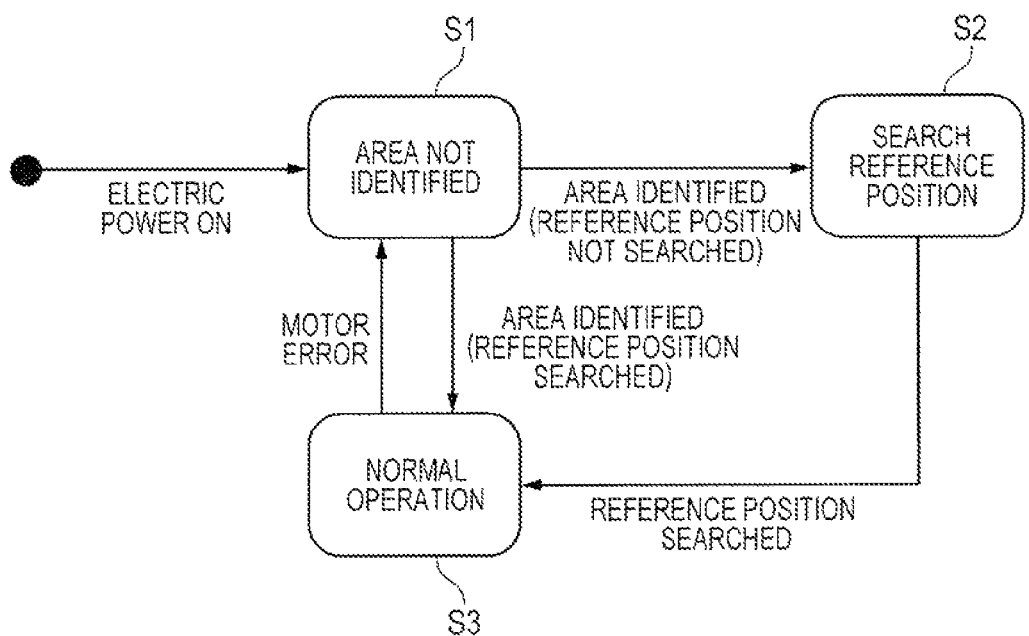
FIG. 6 is a state transition diagram according to the first embodiment.

A general process flow is the same as the first embodiment illustrated in FIG. 6, but the process in S106 to S108 in the area identifying process of the area-not-identified state illustrated in FIG. 7 (specific position movement mode) is different from that in the first embodiment. Therefore, the process of this part is illustrated in a flowchart of FIG. 11.

First, similarly to the first embodiment, the process from S101 to S104 is performed so that the drive is performed until the output level of the rotation detecting sensor is switched. When the output level is switched, the process goes to Step S105, in which a movement amount $P_{current}$ in the current area is cleared. After that, the motor is driven continuously until the output level is switched again (until the result becomes Y in S106), or until $P_{current}$ becomes larger than the number of pulses $P_{min\_d}$ corresponding to an angle that is a sum of a minimum angle width $\theta_{min}$ and the error $\Delta\theta$ (until the driven unit is moved by a predetermined amount or larger (until the result becomes Y in S121) in a state where the detection area after changing is detected in S104). When $P_{current}$ is larger than $P_{min\_d}$ in Step S121 (Y in S121), it is distinguished that the drive direction is not toward the reference position but toward the edge. Therefore, the process goes to Step S122 in which reverse operation is performed, and the process proceeds to Step S123. In Step S123, the sensor slit is rotated until the output level of the rotation detecting sensor is switched. When the output level is switched, the process proceeds to Step S124.

When the output level is switched again in Step S106, the process goes to Step S124 in which the movement amount $P_{current}$ is cleared. The case where the process goes to Step S124 is a case where the sensor slit is rotating in the counterclockwise direction just after the position being detected by the rotation detecting sensor is moved from A2 to A3, from A4 to A5, from A6 to A7, from A8 to A9, from A10 to A11, or from A12 to A13. Otherwise, it is a case where the sensor slit is rotating in the clockwise direction just after the position being detected by the rotation detecting sensor is moved from A23 to A22, from A21 to A20, from A19 to A18, from A17 to A16, from A15 to A14, or from A13 to A12. When the process proceeds to Step S124, it is confirmed that the drive is being performed in the direction toward the reference position. By performing the reference position detection process illustrated in FIG. 8 in this state, the reference position can be detected accurately. Steps S101 to S122 are regarded as the drive direction determining step for determining the drive direction toward base position.

Further, by performing the drive until passing the sensor again, the current area can be identified. The process for this purpose is from S123 to S127 (area identifying step). The movement amount $P_{current}$ in the current area is cleared (S123). In S125, the motor is driven continuously until the output level of the rotation detecting sensor is switched (until the result becomes Y in S125). When the output level is switched, the process proceeds to Step S126. In Step S126, if the movement amount $P_{current}$ is not greater than $P_{min\_d}$, the process proceeds to Step S124 and when the movement amount $P_{current}$ is greater than $P_{min\_d}$, the process proceeds to Step S127 in which the area can be identified in the same manner as the first embodiment as illustrated in FIG. 10B. Then, after the area is identified, the process goes to Step S128, and the area identifying process is finished.

Figure 11:
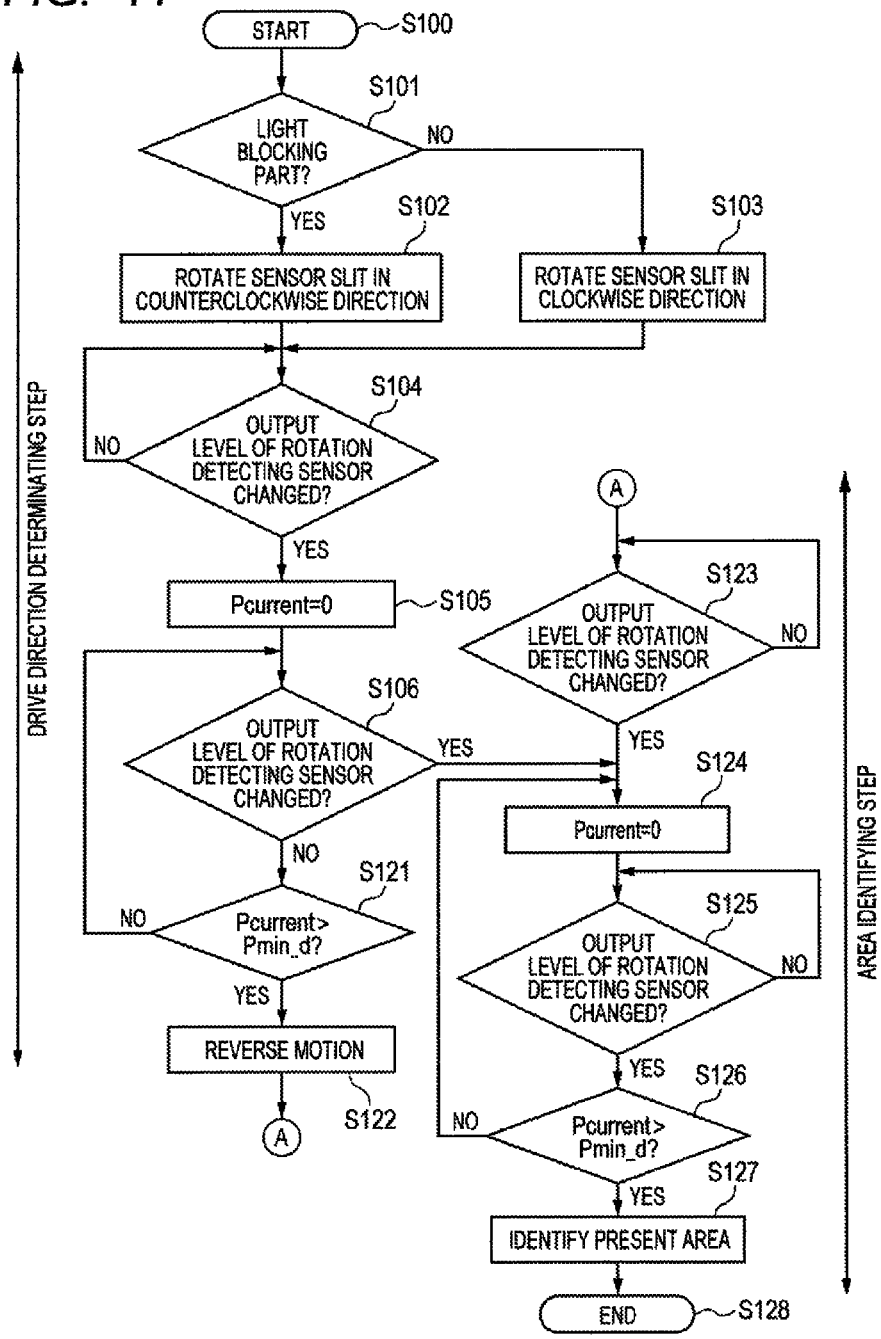
FIG. 11 is a flowchart of the CPU process in the area-not-identified state according to the second embodiment.

In other words, the process of the flowchart of FIG. 11 is summarized as follows. The apparatus is driven in the drive direction determined corresponding to the area detected by the rotation detecting sensor when the drive in the specific position movement mode is started (S102 and S103). After the area detected by the rotation detecting sensor changes (Y in S104), when the apparatus is moved by a predetermined amount or larger in the state where the changed area is detected (Y in S121), the drive direction of the apparatus is reversed (S122). Thus, a width (angle) of an area after passing the area having the minimum angle $\theta_{min}$, is measured, and the area is identified based on the data shown in the table of FIG. 10B. In the sensor slit of this embodiment, on one side (clockwise direction side) with respect to a predetermined base position (reference position) on the sensor slit in a relative movement direction of the rotation detecting sensor, all the light-blocking portions have a predetermined minimum angle width $\theta_{min}$, and the translucent portions have different widths larger than the minimum angle width $\theta_{min}$. In addition, on the other side (counterclockwise direction side), all the translucent portions have the predetermined minimum angle width $\theta_{min}$, and the light-blocking portions have different widths larger than the minimum angle width $\theta_{min}$.

In this way, by inserting a plurality of areas having the minimum angle $\theta_{min}$, it is possible to know whether the drive direction is toward the base position or toward the edge when driving to move a sum of twice the minimum angle width $\theta_{min}$ and the error $\Delta\theta$. Therefore, it is possible to judge more quickly whether or not the moving direction is toward the base position. In addition, as to the area adjacent to the edge, it is sufficient that the area is larger than a sum of $\theta_{min}$ and $\Delta\theta_{motor}$, which is necessary for the motor to stop. Therefore, the area can be identified without abutting the edge even in a smaller area.

In addition, as to the method of constituting the light-blocking portions and the translucent portions on the sensor slit, it is not necessary that all the widths of the light-blocking portions (translucent portion) on one side (translucent portions (light-blocking portion) on the other side) with respect to the base position are the predetermined minimum width $\theta_{min}$. The sensor slit may be constituted as follows. On one side with respect to the predetermined base position of the sensor slit in the relative movement direction to the rotation detecting sensor, the sensor slit has the plurality of light-blocking portions having a relatively small width in the plurality of light-blocking portions and the plurality of translucent portions having different widths larger than the plurality of light-blocking portions on the one side. On the other side with respect to the predetermined base position, the sensor slit has the plurality of translucent portions having a relatively small width in the plurality of translucent portions and the plurality of light-blocking portions having different widths larger than the plurality of translucent portions on the other side. However, in order to judge more quickly whether or not the moving direction is toward the base position, as exemplified in the above-mentioned embodiment, it is preferred to adopt the structure in which the light-blocking portions have a predetermined minimum width on one side with respect to the base position, and the translucent portions have a predetermined minimum width on the other side.

The system derived from this embodiment is similar to the system derived from the first embodiment.

By the above-mentioned method, in addition to the effect similar to that of the first embodiment, it is possible to judge in which direction from the base position the current position is by smaller driving amount. Therefore, the base position can be detected more quickly, and hence the initialization operation can be performed more quickly. In addition, because the number of areas can be increased, a state in which the drive is stopped by an external force can be detected more quickly. In addition, because it is not necessary that the part adjacent to the edge is the area having a largest angle, a shape of the sensor slit and a position of the edge can be selected more flexibly.

Third Embodiment

Hereinafter, a third embodiment of the present invention is described.

Figure 12A:
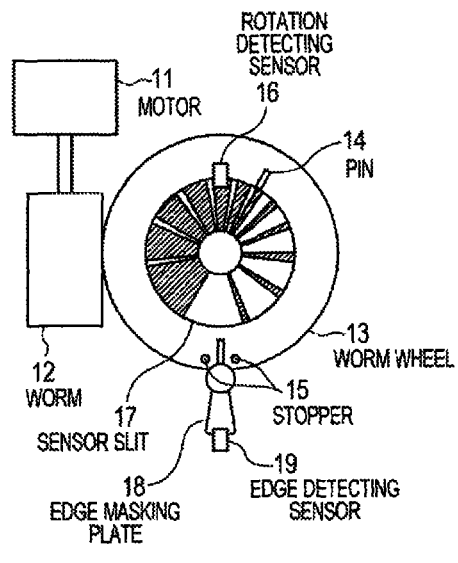
FIG. 12A is a block diagram of a driving unit according to a third embodiment of the present invention viewed from a worm wheel shaft direction.
Figure 12B:
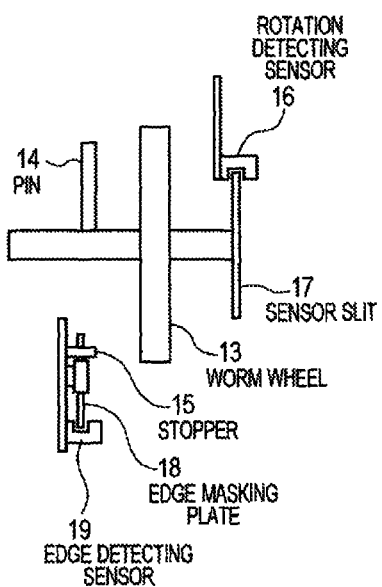
FIG. 12B is a block diagram of the driving unit according to the third embodiment viewed from a direction perpendicular to the worm wheel shaft.
Figure 12C:
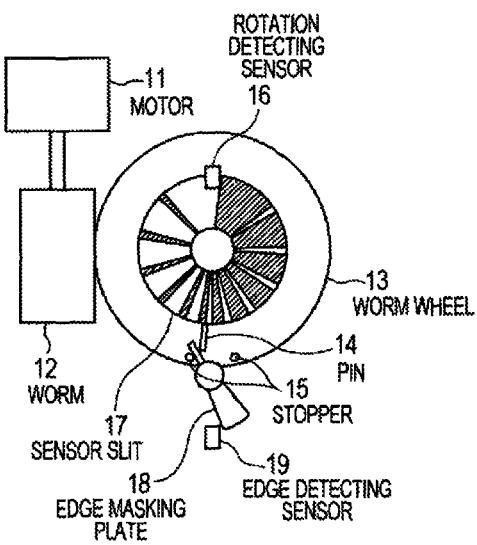
FIG. 12C is a block diagram of the driving unit according to the third embodiment viewed from the worm wheel shaft direction.

FIGS. 12A to 12C are diagrams copying the driving unit from two different directions, in which FIGS. 12A and 12C illustrate diagrams viewed from an axis direction of the worm wheel 13, and FIG. 12B illustrates a diagram viewed from a direction perpendicular to the axis of the worm wheel 13. Compared with FIGS. 2A and 2B of the first embodiment, a stopper 15 is changed, and an edge detector including an edge masking plate 18 and an edge detecting sensor 19 is added. In the normal state, as illustrated in FIG. 12A, the edge masking plate masks the detection area of the photointerrupter as the edge detecting sensor. On the other hand, when being rotated to the outside of the predetermined angle, as illustrated in FIG. 12C, the edge masking plate is pushed by the pin to rotate so that the edge detecting sensor detects the state in which the light can be transmitted.

Figure 13:
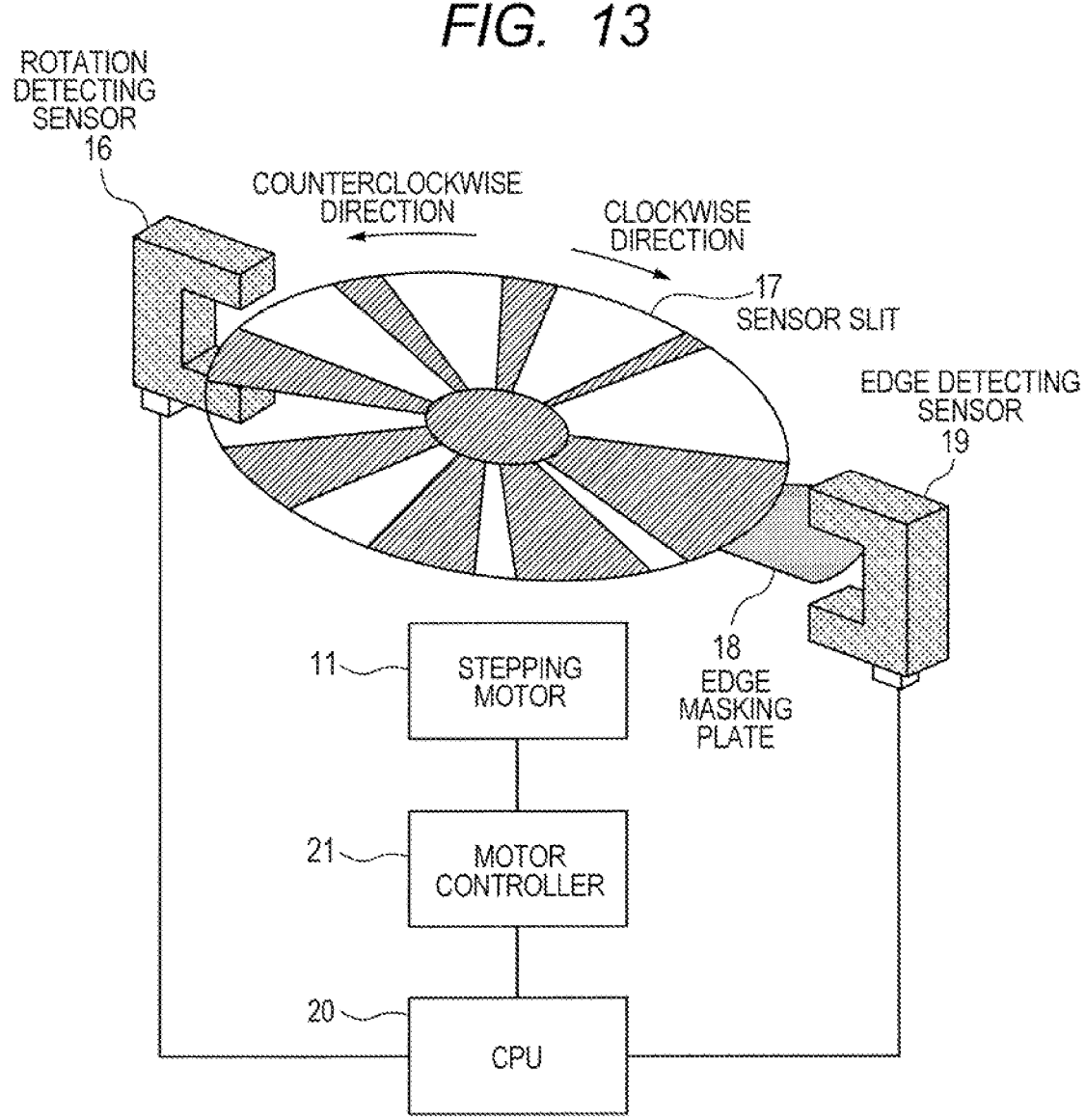
FIG. 13 is a schematic diagram of the driving unit according to the third embodiment.

FIG. 13 illustrates a block diagram in which the structure of the driving unit is simplified. In the structure of FIG. 13, compared with FIG. 3 of the first embodiment, a photointerrupter as the edge detecting sensor and the edge masking plate are added, and hence the CPU can detect a signal of the edge detecting sensor.

Figure 14A:
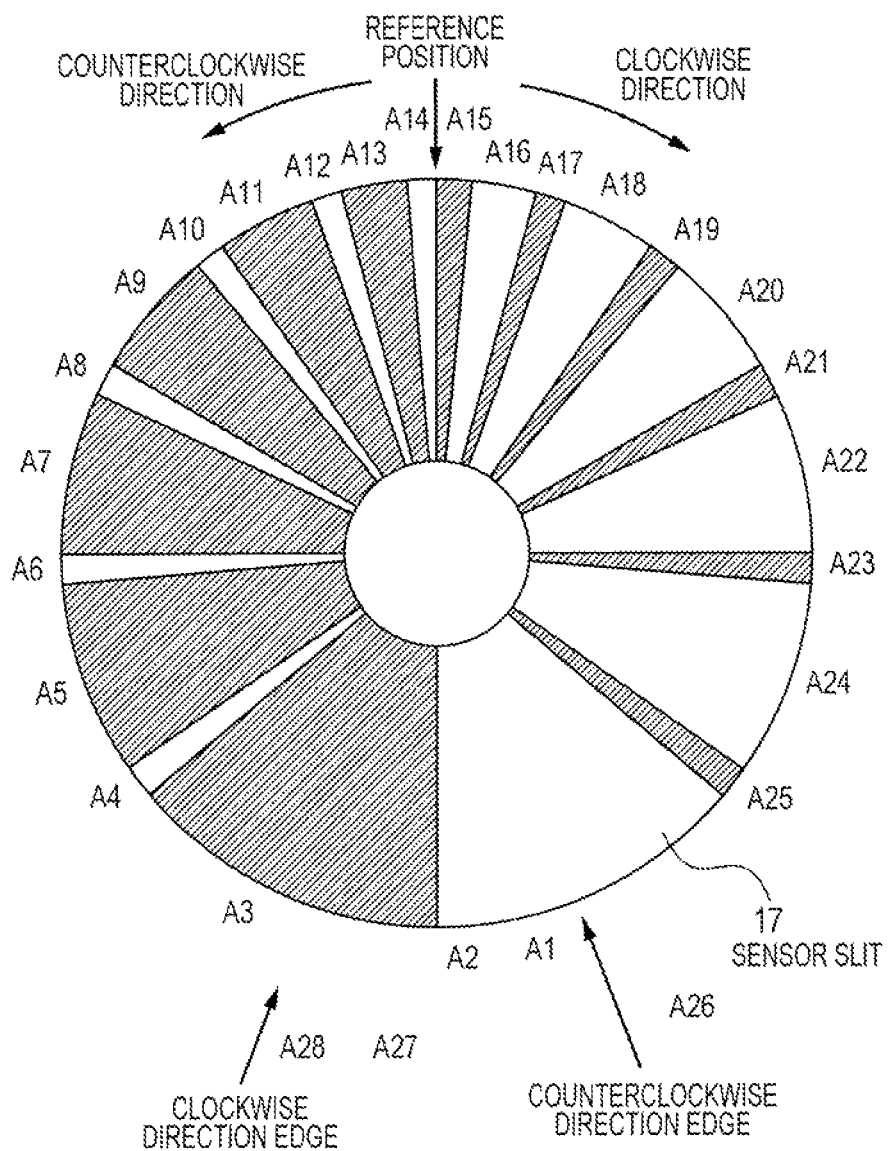
FIG. 14A illustrates an example of the sensor slit shape according to the third embodiment.
Figure 15:
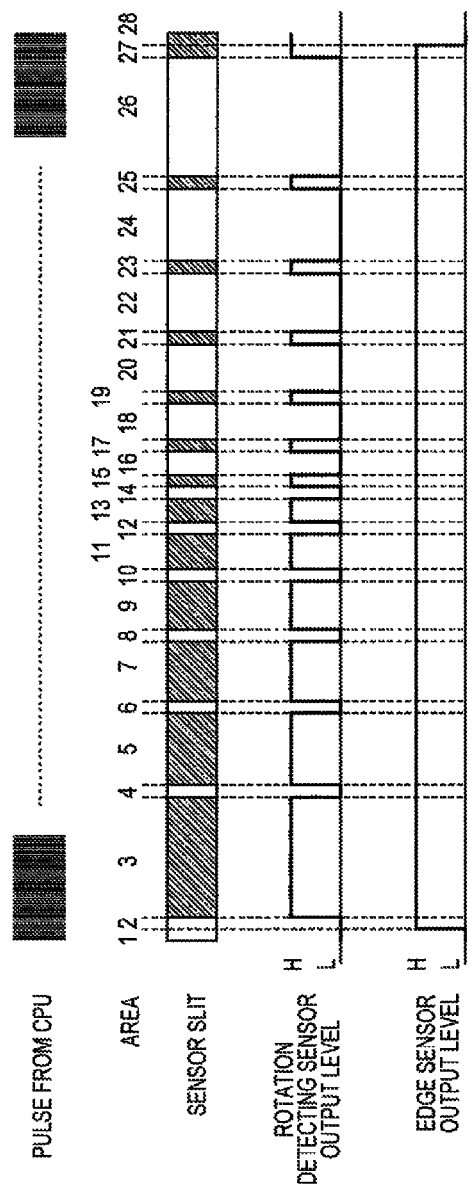
FIG. 15 illustrates an example of output signals of a rotation detecting sensor and an edge detecting sensor according to the third embodiment.

FIG. 14A illustrates an example of a shape of the sensor slit. FIG. 14B is a table showing end portion angles of individual areas of the sensor slit shape. FIG. 15 illustrates output signals of the rotation detecting sensor and the edge detecting sensor when the sensor slit is rotated at a constant speed from the edge in the counterclockwise direction (the edge when the sensor slit is rotated in the clockwise direction) to the edge in the clockwise direction (the edge when the sensor slit is rotated in the counterclockwise direction). The shape of the sensor slit illustrated in FIG. 14A is similar to FIG. 10 of the second embodiment, but arrangement of areas is different because the edge position is different. When the sensor slit is driven close to the edge as described above, the masking plate is pressed so that the edge detecting sensor detects the state in which the light can be transmitted, and hence the output signal becomes L level. When the sensor slit is apart from the edge, the edge detecting sensor detects the state in which light is blocked by the masking plate, and hence the output signal becomes H level.

Figure 16:
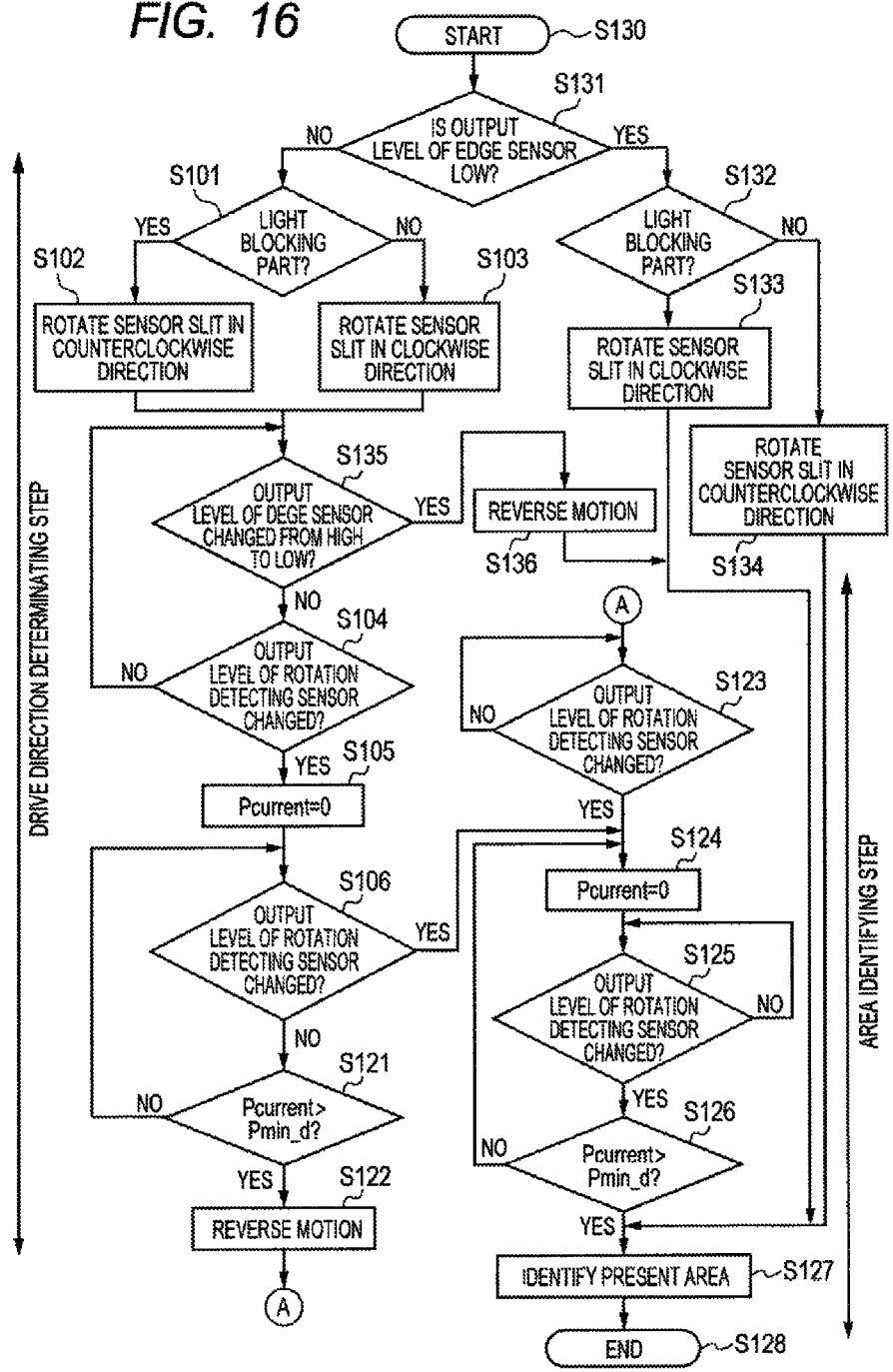
FIG. 16 is a flowchart of the CPU process in the area-not-identified state according to the third embodiment.

The general process flow is similar to the first embodiment illustrated in FIG. 6, but the area identifying process of the area-not-identified state is different. FIG. 16 illustrates a flowchart of the process.

First, the CPU detects a signal of the edge detecting sensor (S131). When the signal of the edge detecting sensor is H level, similarly to the first and second embodiments, it is judged whether or not the current position is the light-blocking portion based on the signal of the rotation detecting sensor (S101). When the current position is the light-blocking portion, the sensor slit is rotated in the counterclockwise direction (S102). When the current position is not the light-blocking portion, the sensor slit is rotated in the clockwise direction (S103), and the process goes to Step S135.

In Step S135, it is determined whether or not the output of the edge detecting sensor changed from H level to L level. If it changed from H level to L level which indicates that the current position is one of the edge positions and the sensor slit is rotating toward one of edges, the process proceeds to Step S136 to reverse the drive direction and then returns to Step S127. If the output of the edge detecting sensor changing from H level to L level is not observed, the process goes to Step S104. Step S104 and the subsequent steps are similar to the process of the second embodiment illustrated in FIG. 11 so that the area can be identified. Note that the process returns not to Step S104 but to Step S135 when "NO" is determined in Step S104 and after Step S122, which is different from Step S104 and the subsequent Steps shown in FIG. 11 of embodiment 2.

On the other hand, when the signal of the edge detecting sensor is L level, the signal of the rotation detecting sensor is detected (S132). When the current position is the light-blocking portion, the sensor slit is rotated in the clockwise direction (S133). When the current position is not the light-blocking portion, the sensor slit is rotated in the counterclockwise direction (S134). When the signal of the edge detecting sensor is L level, the area can be identified only by checking whether the current position is the light-blocking portion or the translucent portion based on the signal of the rotation detecting sensor, and therefore the process goes to S127.

As a system derived from this embodiment, it is possible to adopt a structure in which, instead of using the photointerrupter for edge detection and the edge masking plate, a micro switch to which a spring is connected and a member for pushing the switch are used so that the micro switch is pushed near the edge. Other than that, it is possible to adopt any structure as long as the detection signal is switched at the time of rotation by 360 degrees or more. The sensor slit shape is similar to the case of the second embodiment, but may be similar to the first embodiment. As described above as the derived systems, any shape can be adopted as long as the shape meets the condition.

By the method described above, the drive in the rotation range of 360 degrees or larger is achieved by the simplified structure while the same effect as the second embodiment can be obtained.

Fourth Embodiment

Hereinafter, a fourth embodiment of the present invention is described.

Figure 17:
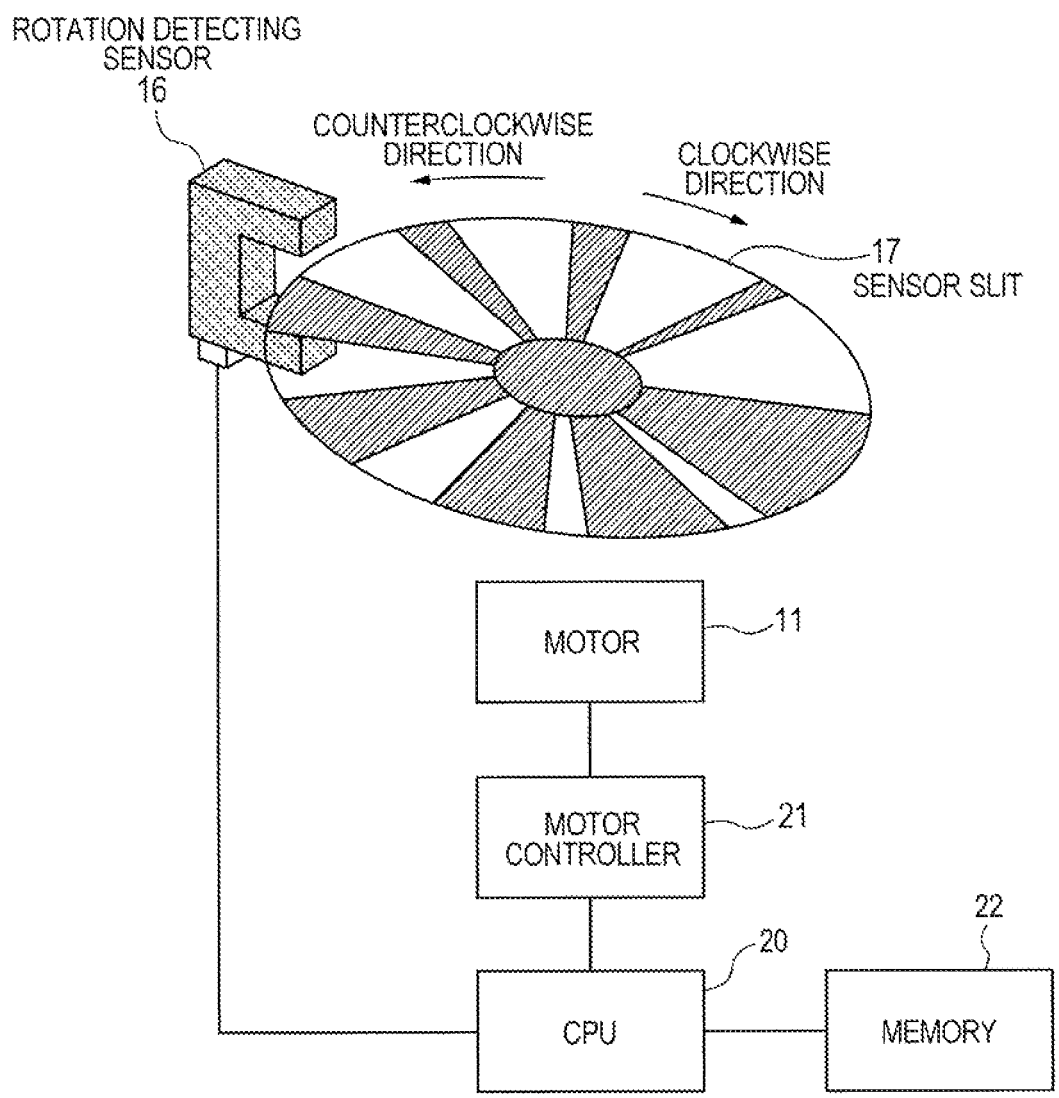
FIG. 17 is a block diagram of a driving unit according to a fourth embodiment of the present invention.

FIG. 17 is a block diagram in which the structure of the driving unit is simplified according to the fourth embodiment of the present invention. In FIG. 17, compared with FIG. 3 of the first embodiment, a memory 22 is added as a storage unit for storing the position data of each area (namely, the drive amount).

Figure 18:
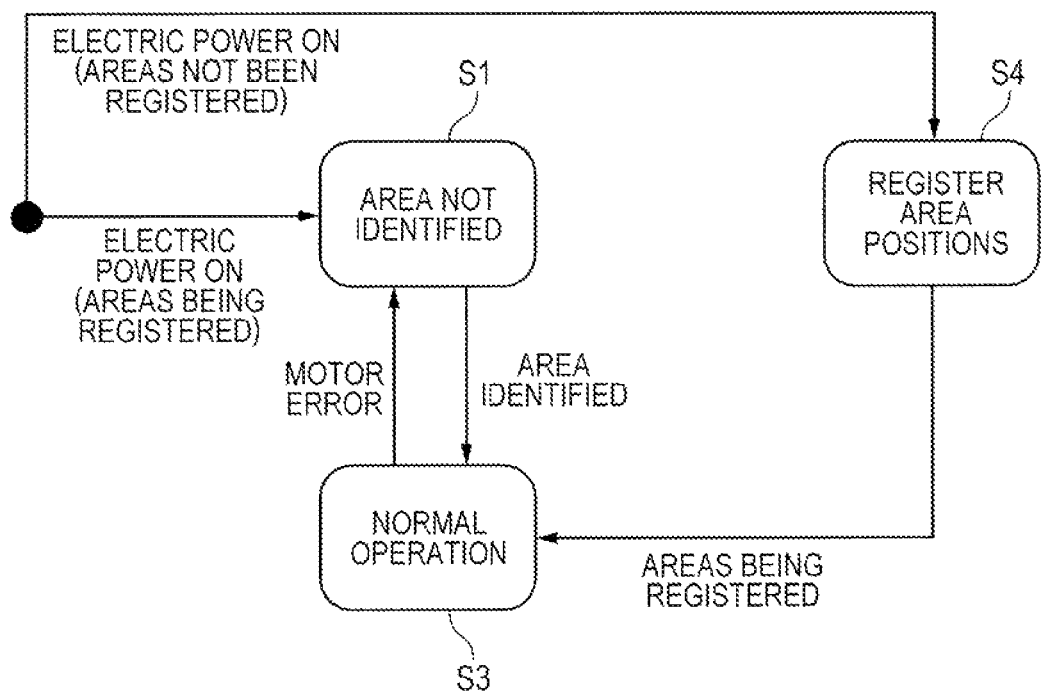
FIG. 18 is a state transition diagram according to the fourth embodiment.

FIG. 18 illustrates a state transition diagram in the fourth embodiment of the present invention. In FIG. 18, compared with FIG. 6 of the first embodiment, the reference position search (S2) is eliminated, and area position registration (S4) is added.

At the time of electric power-on, the CPU reads data of a predetermined address in the memory so as to judge whether or not the position data of each area is registered. When the position data is registered, similarly to the first embodiment, the state becomes the area-not-identified state, in which the area identifying operation is performed. In this embodiment, because the reference position search is not necessary, the process goes to the normal operation after the area is identified. When a motor error occurs in the normal operation, similarly to the first embodiment, the state becomes the area-not-identified state, in which the area determination operation is performed again. On the other hand, when the position data is not registered at the time of electric power-on, an area position registration operation is performed. When the area position registration operation is completed, the area is identified, and the process goes to the normal operation.

Next, the area position registration operation is described with reference to a flowchart of FIG. 19. When the area position registration operation is started, the sensor slit is first moved to the CW end (S401) manually or by control of the motor by a movement amount sufficient to move to the end. After that, while the sensor slit is moved in the counterclockwise direction (S402), it is judged whether or not the output level of the rotation detecting sensor is switched (S403). When the output level is switched, the number of pulses indicating the position is registered in the memory (S404). This registration operation is repeated until the sensor slit reaches the CCW end (S405). After the sensor slit reaches the CCW end, the sensor slit is moved in the opposite direction, and the position registration is performed similarly (S406 to S409). In this way, it is possible to obtain data indicating the angle width of each area in which an error $\Delta\theta_{position}$ depending on attachment accuracy of the rotation detecting sensor and the sensor slit described in the first to third embodiments is taken into account. Therefore, it is possible to identify the position more accurately. Therefore, the difference between the minimum slit angle and each area, which is twice $\Delta\theta$ or larger in the first to third embodiments, is sufficient to be larger than a sum of $\Delta\theta_{sensor}$ and $\Delta\theta_{print}$. Therefore, the sensor slit shape can be finer. In addition, when the area is identified, the position can be identified in a range of the error $\Delta\theta_{sensor}$ of the detector. Therefore, it is not necessary to perform the reference position detection.

As a system derived from this embodiment, it is possible to use a memory embedded in the CPU, though the memory in this embodiment is provided separately from the CPU. The area position registration may be performed two times or more, and it is possible to transition to the area registered state when a predetermined condition is satisfied in the normal operation state.

By the method described above, in addition to the effect of the first to third embodiments, it is possible to make the width of the sensor slit finer. Thus, the detection of a rotation error due to an external force and the area identifying operation can be performed by a smaller movement amount. In addition, it is not necessary to perform the reference position detection in the initialization operation, and only the area identifying operation is sufficient. Therefore, the initialization operation can be completed more quickly.

In the above-mentioned embodiments, the driving apparatus of the present invention is described with an example in which the driven unit is rotated. However, the present invention is not limited to rotation operation drive, but the same effect can be obtained even in the case of linear operation drive. Specifically, the same effect as in the present invention can be obtained in a structure in which the sensor slit (portion to be detected) having a structure in which the first areas and the second areas are alternately arranged in the linear movement direction as the driving direction is detected by the sensor that is driven together with the driven unit.

The driving apparatus described in any one of the above-mentioned embodiments can be applied to a driving apparatus of a pan and tilt mechanism of a camera platform apparatus on which an image pickup apparatus is mounted. In this way, it is possible to realize the camera platform apparatus that can complete an initialization process of a pan angle and a tilt angle quickly only by performing a pan and tilt operation in a small angle width without performing a panning operation and a tilting operation in a wide angle in the initialization at the time of electric power-on.

In addition, the driving apparatus described above in any one of the above-mentioned embodiments can be applied to a driving apparatus of a mechanism for driving a lens in an optical axis direction in a lens apparatus including a lens that can move in the optical axis direction. Thus, it is possible to realize a lens apparatus that can quickly complete an initialization process of a lens position only by driving the lens in a small moving range without driving the lens in a wide moving range in the initialization at the time of electric power-on. In this case, the driving apparatus to be used may be used for a rotation driving apparatus of a cylindrical cam mechanism for driving the lens in the optical axis direction, or the driving apparatus of the present invention may be used for linear drive of the lens in the optical axis direction.

In addition, in each of the above-mentioned embodiments, both the translucent portions and the light-blocking portions have two or more different widths (angle widths), but this structure should not be interpreted as a limitation. For instance, it is possible to adopt a structure in which all the translucent portions have the same width while only the light-blocking portions have different widths, and vice versa.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-126391, filed Jun. 6, 2011, which is hereby incorporated by reference herein in its entirety.

What is claimed is:

1. A driving apparatus comprising:
a driving unit arranged to drive a driven unit;
a controller arranged to control the driving unit;
a portion to be detected, including a plurality of first areas and a plurality of second areas, which have a different characteristic from the plurality of first areas, arranged alternately; and
a detector arranged to detect which one of said plurality of first areas or second areas is positioned at a predetermined detection position, wherein:
one of the portion to be detected or the detector is arranged to move in association with a relative movement of the driven unit with respect to the driving unit,
widths, in a relative direction of movement relative to the detector, of the plurality of first areas disposed on one side of the portion to be detected with respect to a predetermined base position in the relative direction of movement, are different from each other and each of the widths is larger than a width, in the relative direction of movement, of any one of the plurality of first areas disposed in the other side of the portion to be detected with respect to the predetermined base position,
widths, in the relative direction of movement relative to the detector, of the plurality of second areas disposed on the other side of the portion to be detected with respect to the predetermined base position in the relative direction of movement, are different from each other and each of the widths is larger than a width, in the relative direction of movement, of any one of the plurality of second areas disposed in the one side of the portion to be detected with respect to the predetermined base position, and
when the driving apparatus operates in a specific position movement mode where the driven unit is moved to a specific position, the controller controls the driving unit to drive the driven unit in a drive direction determined in accordance with an area detected by the detector when starting the operation in the specific position movement mode, and reverses the drive direction of the driven unit to move the driven unit to the specific position in a case where the driven unit is moved by a predetermined amount or larger in a state in which, after the area detected by the detector is changed, the changed area is being detected.

2. The driving apparatus according to claim 1, further comprising a malfunction detector that judges whether or not the driving apparatus is properly driving the driven unit based on a drive control signal from the controller for controlling the driving unit and a detection signal from the detector.

3. The driving apparatus according to claim 2, further comprising:
a position identifying unit configured to identify a position of the driven unit based on an output of the detector and the drive control signal,
wherein when the malfunction detector judges that the driving apparatus is not driving properly, the position identifying unit identifies a position.

4. The driving apparatus according to claim 2, further comprising:
a storage unit configured to store a drive amount of the portion to be detected corresponding to the drive control signal of the controller,
wherein the storage unit stores the drive amount corresponding to the width of each of the plurality of first areas and the width of each of the plurality of second areas.

5. The driving apparatus according to claim 1, wherein the portion to be detected rotates with respect to the detector.

6. The driving apparatus according to claim 5, further comprising:
an edge detector that detects that the portion to be detected has rotated beyond a predetermined angle range,
wherein the portion to be detected has a rotation moving range of 360 degrees or larger.

7. The driving apparatus according to claim 1, wherein the portion to be detected moves in a linear direction with respect to the detector.

8. The driving apparatus according to claim 1, wherein:
the detector includes a photo detector, and
one of the first area or the second area is a light-blocking portion that blocks light, and the other is a translucent portion that transmits light.

9. A camera platform apparatus to which an image pickup apparatus is mountable, the camera platform comprising:
a driven mechanism; and
a driving apparatus configured to drive the driven mechanism,
wherein the driving apparatuses comprises:
a driving unit arranged to drive a driven unit;
a controller arranged to control the driving unit;
a portion to be detected, including a plurality of first areas and a plurality of second areas, which have a different characteristic from the plurality of first areas, arranged alternately; and
a detector arranged to detect which one of said plurality of first areas or second areas is positioned at a predetermined detection position,
wherein:
one of the portion to be detected or the detector is arranged to move in association with a relative movement of the driven unit with respect to the driving unit,
widths, in a relative direction of movement relative to the detector, of the plurality of first areas disposed on one side of the portion to be detected with respect to a predetermined base position in the relative direction of movement, are different from each other and each of the widths is larger than a width, in the relative direction of movement, of any one of the plurality of first areas disposed in the other side of the portion to be detected with respect to the predetermined base position,
widths, in the relative direction of movement relative to the detector, of the plurality of second areas disposed on the other side of the portion to be detected with respect to the predetermined base position in the relative direction of movement, are different from each other and each of the widths is larger than a width, in the relative direction of movement, of any one of the plurality of second areas disposed in the one side of the portion to be detected with respect to the predetermined base position, and
when the driving apparatus operates in a specific position movement mode where the driven unit is moved to a specific position, the controller controls the driving unit to drive the driven unit in a drive direction determined in accordance with an area detected by the detector when starting the operation in the specific position movement mode, and reverses the drive direction of the driven unit to move the driven unit to the specific position in a case where the driven unit is moved by a predetermined amount or larger in a state in which, after the area detected by the detector is changed, the changed area is being detected.

10. A lens apparatus comprising:
a movable optical element; and
a driving apparatus configured to drive the movable optical element,
wherein the driving apparatus comprises:
a driving unit that drives a driven unit;
a controller that controls the driving unit;
a portion to be detected, including a plurality of first areas and a plurality of second areas, which have a different characteristic from the plurality of first areas, arranged alternately; and
a detector that detects which one of the plurality of first areas or one of the plurality of the plurality of second areas of the portion to be detected is positioned at a predetermined detection position,
wherein:
one of the portion to be detected or the detector moves in association with a relative movement of the driven unit with respect to the driving unit;
widths, in a relative direction of movement relative to the detector, of the plurality of first areas disposed on one side of the portion to be detected with respect to a predetermined base position in the relative direction of movement, are different from each other and each of the widths is larger than a width, in the relative direction of movement, of any one of the plurality of first areas disposed in the other side of the portion to be detected with respect to the predetermined base position,
widths, in the relative direction of movement relative to the detector, of the plurality of second areas disposed on the other side of the portion to be detected with respect to the predetermined base position in the relative direction of movement, are different from each other and each of the widths is larger than a width, in the relative direction of movement, of any one of the plurality of second areas disposed in the one side of the portion to be detected with respect to the predetermined base position, and
when the driving apparatus operates in a specific position movement mode where the driven unit is moved to a specific position, the controller controls the driving unit to drive the driven unit in a drive direction determined in accordance with an area detected by the detector when starting the operation in the specific position movement mode, and reverses the drive direction of the driven unit to move the driven unit to the specific position in a case where the driven unit is moved by a predetermined amount or larger in a state in which, after the area detected by the detector is changed, the changed area is being detected.

11. A method of controlling a driving apparatus comprising:
a driving unit that drives a driven unit;
a controller that controls the driving unit;
a portion to be detected, including a plurality of first areas and a plurality of second areas, which have a different characteristic from the plurality of first areas, arranged alternately; and
a detector that detects which one of the plurality of first areas or one of the plurality of the plurality of second areas of the portion to be detected is positioned at a predetermined detection position,
wherein one of the portion to be detected or the detector is configured to move in association with a relative movement of the driven unit with respect to the driving unit,
wherein widths, in a relative direction of movement relative to the detector, of the plurality of first areas disposed on one side of the portion to be detected with respect to a predetermined base position in the relative direction of movement, are different from each other and each of the widths is larger than a width, in the relative direction of movement, of any one of the plurality of first areas disposed in the other side of the portion to be detected with respect to the predetermined base position, and wherein widths, in the relative direction of movement relative to the detector, of the plurality of second areas disposed on the other side of the portion to be detected with respect to the predetermined base position in the relative direction of movement, are different from each other and each of the widths is larger than a width, in the relative direction of movement, of any one of the plurality of second areas disposed in the one side of the portion to be detected with respect to the predetermined base position, wherein the method comprises:

a driving operating step of operating the driving apparatus in a specific position movement mode where the driven unit is moved to a specific position, wherein the driving operating step comprises:

a drive direction determining step of driving the driven unit in a drive direction determined in accordance with an area detected by the detector when the operation in the specific position movement mode is started; and a drive direction reversing step of reversing the drive direction of the driven unit in a case where the driven unit is moved by a predetermined amount or larger in a state in which, after the area detected by the detector is changed, the changed area is being detected.

12. A driving apparatus comprising:

a driving unit that drives a driven unit;

a controller that controls the driving unit;

a portion to be detected, including a plurality of first areas and a plurality of second areas, which have a different characteristic from the plurality of first areas, arranged alternately; and a detector that detects which one of the plurality of first areas or one of the plurality of second areas of the portion to be detected is positioned at a predetermined detection position, wherein:

one of the portion to be detected or the detector moves in association with a relative movement of the driven unit with respect to the driving unit, the portion to be detected includes a largest first area having a largest width, which is larger than any width of the other first areas, in a relative direction of movement relative to the detector, among the plurality of first areas and a largest second area having a largest width, which is larger than any width of the other second areas, in the relative direction of movement, among the plurality of second areas, the largest first area and the largest second area being disposed on opposite sides, in the relative direction of movement, with respect to a predetermined base position of the portion to be detected and disposed farthest from the base position, the base position being positioned at the predetermined detection position when the driven unit is moved to a specific position, and when the driving apparatus operates in a specific position movement mode where the driven unit is moved to the specific position, the controller controls the driving unit to drive the driven unit in a drive direction determined in accordance with an area detected by the detector when starting the operation in the specific position movement mode, and reverses the drive direction of the driven unit to move the driven unit to the specific position in a case where the driven unit is moved by a predetermined amount or larger in a state in which, after the area detected by the detector is changed, the changed area is being detected.

13. The driving apparatus according to claim 12, wherein:

each of widths of the plurality of first areas disposed on one side of the portion to be detected with respect to a predetermined base position where the largest first area is disposed in the one side, is larger than a width of any one of the plurality of first areas disposed in the other side of the portion to be detected with respect to the predetermined base position where the largest second area is disposed in said the other side, and each of widths of the plurality of second areas disposed on the other side of the portion to be detected with respect to the predetermined base position where the largest second area is disposed in said the other side, is larger than a width of any one of the plurality of first areas disposed in said one side of the portion to be detected with respect to the predetermined base position where the largest first area is disposed in said one side.

14. A method of controlling a driving apparatus comprising:

a driving unit that drives a driven unit;

a controller that controls the driving unit;

a portion to be detected, including a plurality of first areas and a plurality of second areas, which have a different characteristic from the plurality of first areas, arranged alternately; and a detector that detects which one of the plurality of first areas or one of the plurality of second areas of the portion to be detected is positioned at a predetermined detection position, wherein one of the portion to be detected or the detector is configured to move in association with a relative movement of the driven unit with respect to the driving unit, wherein the portion to be detected includes a largest first area having a largest width, which is larger than any width of the other first areas, in a relative direction of movement relative to the detector, among the plurality of first areas and a largest second area having a largest width, which is larger than any width of the other second areas, in the relative direction of movement, among the plurality of second areas, the largest first area and the largest second area being disposed on opposite sides, in the relative direction of movement, with respect to a predetermined base position of the portion to be detected and disposed farthest from the base position, the base position being positioned at the predetermined detection position when the driven unit is moved to a specific position, wherein the method comprises:

a driving operating step of operating the driving apparatus in a specific position movement mode where the driven unit is moved to the specific position, and wherein the driving operating step comprises:

a drive direction determining step of driving the driven unit in a drive direction determined in accordance with an area detected by the detector when the operation in the specific position movement mode is started; and a drive direction reversing step of reversing the drive direction of the driven unit in a case where the driven unit is moved by a predetermined amount or larger in a state in which, after the area detected by the detector is changed, the changed area is detected.

15. A camera platform to which an image pickup apparatus is mountable, the camera platform comprising:

a driven mechanism for panning or tilting; and a driving apparatus configured to drive the mechanism for panning or tilting, the driving apparatus, comprising:
　　a driving unit that drives a driven unit;
　　a controller that controls the driving unit;
　　a portion to be detected, including a plurality of first areas and a plurality of second areas, which have a different characteristic from the plurality of first areas, arranged alternately; and
　　a detector that detects which one of the plurality of first areas or one of the plurality of second areas of the portion to be detected is positioned at a predetermined detection position,
wherein one of the portion to be detected or the detector moves in association with a relative movement of the driven unit with respect to the driving unit,
wherein the portion to be detected includes a largest first area having a largest width, which is larger than any width of the other first areas, in a relative direction of movement relative to the detector, among the plurality of first areas and a largest second area having a largest width, which is larger than any width of the other second areas, in the relative direction of movement, among the plurality of second areas, the largest first area and the largest second area being disposed on opposite sides, in the relative direction of movement, with respect to a predetermined base position of the portion to be detected and disposed farthest from the base position, the base position being positioned at the predetermined detection position when the driven unit is moved to a specific position, and
wherein when the driving apparatus operates in a specific position movement mode where the driven unit is moved to the specific position, the controller controls the driving unit to drive the driven unit in a drive direction determined in accordance with an area detected by the detector when starting the operation in the specific position movement mode, and reverses the drive direction of the driven unit to move the driven unit to the specific position in a case where the driven unit is moved by a predetermined amount or larger in a state in which, after the area detected by the detector is changed, the changed area is being detected.

16. A lens apparatus comprising:
a movable lens element;
a driving apparatus configured to drive the movable optical element,
wherein the driving apparatus comprises:
　　a driving unit that drives a driven unit;
　　a controller that controls the driving unit;
　　a portion to be detected, including a plurality of first areas and a plurality of second areas, which have a different characteristic from the plurality of first areas, arranged alternately; and
　　a detector that detects which one of the plurality of first areas or one of the plurality of second areas of the portion to be detected is positioned at a predetermined detection position,
wherein one of the portion to be detected or the detector moves in association with a relative movement of the driven unit with respect to the driving unit,
wherein the portion to be detected includes a largest first area having a largest width, which is larger than any width of the other first areas, in a relative direction of movement relative to the detector, among the plurality of first areas and a largest second area having a largest width, which is larger than any width of the other second areas, in the relative direction of movement, among the plurality of second areas, the largest first area and the largest second area being disposed on opposite sides, in the relative direction of movement, with respect to a predetermined base position of the portion to be detected and disposed farthest from the base position, the base position being positioned at the predetermined detection position when the driven unit is moved to a specific position, and
wherein when the driving apparatus operates in a specific position movement mode where the driven unit is moved to the specific position, the controller controls the driving unit to drive the driven unit in a drive direction determined in accordance with an area detected by the detector when starting the operation in the specific position movement mode, and reverses the drive direction of the driven unit to move the driven unit to the specific position in a case where the driven unit is moved by a predetermined amount or larger in a state in which, after the area detected by the detector is changed, the changed area is being detected.

\* \* \* \* \*